(12) United States Patent
Clements

(10) Patent No.: US 11,334,165 B1
(45) Date of Patent: May 17, 2022

(54) AUGMENTED REALITY GLASSES IMAGES IN MIDAIR HAVING A FEEL WHEN TOUCHED

(71) Applicant: Sigmund Lindsay Clements, Montreal (CA)

(72) Inventor: Sigmund Lindsay Clements, Montreal (CA)

( * ) Notice: Subject to any disclaimer, the term of this patent is extended or adjusted under 35 U.S.C. 154(b) by 0 days.

(21) Appl. No.: 16/983,857

(22) Filed: Aug. 3, 2020

Related U.S. Application Data

(63) Continuation-in-part of application No. 15/253,913, filed on Sep. 1, 2016, now Pat. No. 10,732,721.

(60) Provisional application No. 62/297,804, filed on Feb. 20, 2016, provisional application No. 62/213,630, filed on Sep. 3, 2015.

(51) Int. Cl.
*G06T 19/00* (2011.01)
*G06F 3/01* (2006.01)
*G06F 3/14* (2006.01)
*G06F 3/0482* (2013.01)
*G06F 3/04817* (2022.01)

(52) U.S. Cl.
CPC .............. *G06F 3/016* (2013.01); *G06F 3/017* (2013.01); *G06F 3/0482* (2013.01); *G06F 3/04817* (2013.01); *G06F 3/1454* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 8,009,022 B2* | 8/2011 | Kipman | ................... | G06F 3/011 340/407.1 |
| 9,310,883 B2* | 4/2016 | Weising | ................... | A63F 13/50 |
| 2012/0113223 A1* | 5/2012 | Hilliges | ................... | G06F 3/00 348/46 |
| 2014/0306891 A1* | 10/2014 | Latta | ................... | G02B 27/017 345/158 |
| 2016/0054791 A1* | 2/2016 | Mullins | ................... | G06T 19/006 345/173 |

OTHER PUBLICATIONS

AlSada et al., ("Parallel Web Browsing in Tangible Augmented Reality Environments", Apr. 18-23, 2015.) (Year: 2015).*

* cited by examiner

*Primary Examiner* — Nicholas R Wilson

(57) ABSTRACT

Augmented reality glasses are used, with a transducer array, to give images, produced by the glasses, a feel in midair. The glasses images can be shown as three-dimensional images, that are located in midair. The images are located near the transducer array. The array produces a touch feel in mid-air. The mid-air touch feel occupies the same space as the image. The feel gives the image a touch feel, when a user touches the image. The touch sense, can give the image a more real interaction when touched, such as, giving an image of a food item like a sandwich, a feel similar to a sandwich feel. The images with feel, allow for an immersive experience, within the augmented reality environment. The feel can move, when the image moves, such as, the user views an image, of another user's hand moving, and feels the movement of the hand.

19 Claims, 8 Drawing Sheets

AUGMENTED REALITY GLASSES IMAGES IN MIDAIR HAVING A FEEL WHEN TOUCHED

CROSS REFERENCE TO RELATED APPLICATIONS

This application is a continuation in part CIP application of application with Ser. No. 15/253,913, filed Sep. 1, 2016. This application claims the benefit of provisional patent applications serial numbers, 62/213,630 filled on Sep. 3, 2015, and 62/297,804 filled on Feb. 20, 2016, which is incorporated by reference.

FEDERALLY SPONSORED RESEARCH Not Applicable

SEQUENCE LISTING OR PROGRAM

None

TECHNICAL FIELD

This description relates to mixed reality glasses images in midair, and addition of senses associated to the images.

BACKGROUND OF THE EMBODIMENTS

Haptic sensations are created in consumer devices by actuators, or motors, which create a vibration. Those vibrations are managed and controlled by embedded software, and integrated into device user interfaces and applications via the embedded control software.

Haptics are in many consumer devices. A rumble effect in a console game controller and a touch vibration on a smartphone dial pad are both examples of haptic effects. In the world of mobile devices, computers, consumer electronics, and digital devices and controls, meaningful haptic information is frequently limited or missing. For example, when dialing a number or entering text on a conventional touchscreen without haptics, users have no sense of whether they've successfully completed a task.

With haptic technology, users feel the vibrating force or resistance as they push a physical button, scroll through a list or encounter the end of a menu. In a video or mobile game with haptics, users can feel the gun recoil, the engine rev, or the crack of the bat meeting the ball. When simulating the placement of cardiac pacing leads, a user can feel the forces that would be encountered when navigating the leads through a beating heart, providing a more realistic experience of performing this procedure.

Haptics can enhance the user experience through improved usability: By restoring the sense of touch to otherwise flat, cold surfaces, haptics creates fulfilling multimodal experiences that improve usability by engaging touch, sight and sound. From the confidence a user receives through touch confirmation when selecting a virtual button to the contextual awareness they receive through haptics in a first-person sports game, haptics improves usability by more fully engaging the user's senses.

Enhanced realism haptics injects a sense of realism into user experiences, by exciting the senses and allowing the user to feel the action and nuance of the application. This is particularly relevant in applications like games or simulation that rely on only visual and audio inputs. The inclusion of tactile feedback provides additional context that translates into a sense of realism for the user.

Touchscreen driven devices lack the physical feedback that humans frequently need to fully understand the context of their interactions. Intuitive and unmistakable tactile confirmation, haptics can create a more confident user experience and can also improve safety by overcoming distractions. This is especially important when audio or visual confirmation is insufficient, such as industrial applications, or applications that involve distractions, such as automotive navigation.

A haptic glove worn on a user's hand, is used to allow a user to receive touch feedback from what an avatar, shown on a display, who is touching objects in a virtual world on the internet.

A projection of an image, by a projector, on the air bourne particles, and transducer created haptic touch is associated to the projection has been used. Drawbacks of this include needing to have a continuous supply of air borne particles, for the projection to reflect off of. The image doesn't move, and the sounds waves may disturb the airborne particles.

Many of the haptic touch on a holographic display surfaces, heretofore known suffer from a number of disadvantages:

Augmented reality AR glasses overlay images, on reality. Many images are three dimensional, and located in midair. They can be interacted with the images, by touch, and vocal commands. The images add to reality, and can give information about the reality.

Many AR images are interacted with, by a user's fingers touch. The fingers touch of the images, can change the images visual make up, such as, shape, color, location, a different image, change of information given by the image. Users receive visual information, when touching the images.

Other senses related to the AR image may include sound, Senses lacking from the AR images, may include, touch, smell, and taste.

Disadvantages

Three dimensional images, from augmented reality AR glasses of, heretofore known suffer from a number of disadvantages:

A. Glasses images in midair, don't have a feel when touched,

B. Images with lack of touch, decrease a user's belief in the visual reality of images, when touched.

C. Images don't supply, touch senses, like, a cool temperature, weight, sand paper texture, or feel movements of the image, so the user needs to imagine the fell, this creates mental work for the user.

SUMMARY

Augmented reality AR glasses, or virtual reality glasses, are used, with a transducer array, to give images, produced by the glasses, a feel in midair. The glasses images can be shown as three-dimensional images, that are located in midair. The images are located near the transducer array. The array produces, a touch feel in mid-air.

The mid-air touch feel, occupies the same space as the image. The feel gives the image a touch feel, when a user touches the image. The touch sense, can give the image a more enjoyable interaction when touched, such as, giving an image of a bird, a feel similar to a bird. Images with feel, allow for an immersive experience, within the augmented reality environment.

The feel can move, when the image moves, such as, the user can view an image, of another user's hand moving, and feel the movement of the hand. Two users can transmit their image, to each other over an internet, allowing them to view each other, and to touch, and feel each other's image, such as, feeling the user user's hand, while shaking the other user's virtual hand.

The feel can be directed, to where a camera in the glasses detects the user, touching the image, or the feel can fill the image with feel.

Advantages

Advantages of AR Glasses Images in Midair Having A Touch Feel

There are multiple benefits to a user derived from using, a having a user interface, to operate a device. The advantages of the haptic mid-air touch feedback with midair holograms without limitation, are improved mid-air touch user feeling interaction with displayed avatars, holograms, other users, museum objects, and feeling in online worlds.

From the ensuing description, a number of advantages of some of the embodiments, of the mixed reality headset hologram s with haptic touch become evident.

A. A user doesn't put their hand through the image, due to touch having them knowing where the images starts, with the touch associated to the image.

B. The images are more realistic, with touch feel, such as, a bird that has feel when stationary, and moving, brings a more immersive experience to touch interaction with the bird.

C. Two users can touch each other, and see each other, over an internet.

D. Touch with AR glasses images, can give, information, such as, warm temperature, weight, mass, ruff surface associated to the image, and movements.

BRIEF DESCRIPTION OF THE DRAWINGS—Figures

REFERENCE NUMBERS

1502 MR glasses
1504 holograms
1506 transducers array
1508 mid-air haptic touch
1510 store checkout payment station
1512 user
1514 display holograms
1604 holograms
1606 transducers array
1608 mid-air haptic touch
1610 keyboard
1616 camera
1702 MR glasses
1704 holograms
1706 transducers array
1708 mid-air haptic touch
1712 user
1802 MR glasses
1804 holograms
1806 transducers array
1808 mid-air haptic touch
1810 user
1812 second user
1814 second MR glasses
1816 second holograms
1818 second transducers array
1820 second mid-air haptic touch
1822 cameras
2002 MR glasses
2006 body sized transducer array
2010 user

DETAILED DESCRIPTION FIRST EMBODIMENT

Mid-Air Haptic Touch Corresponding to 3D Objects Description and Operation

Figure 1:
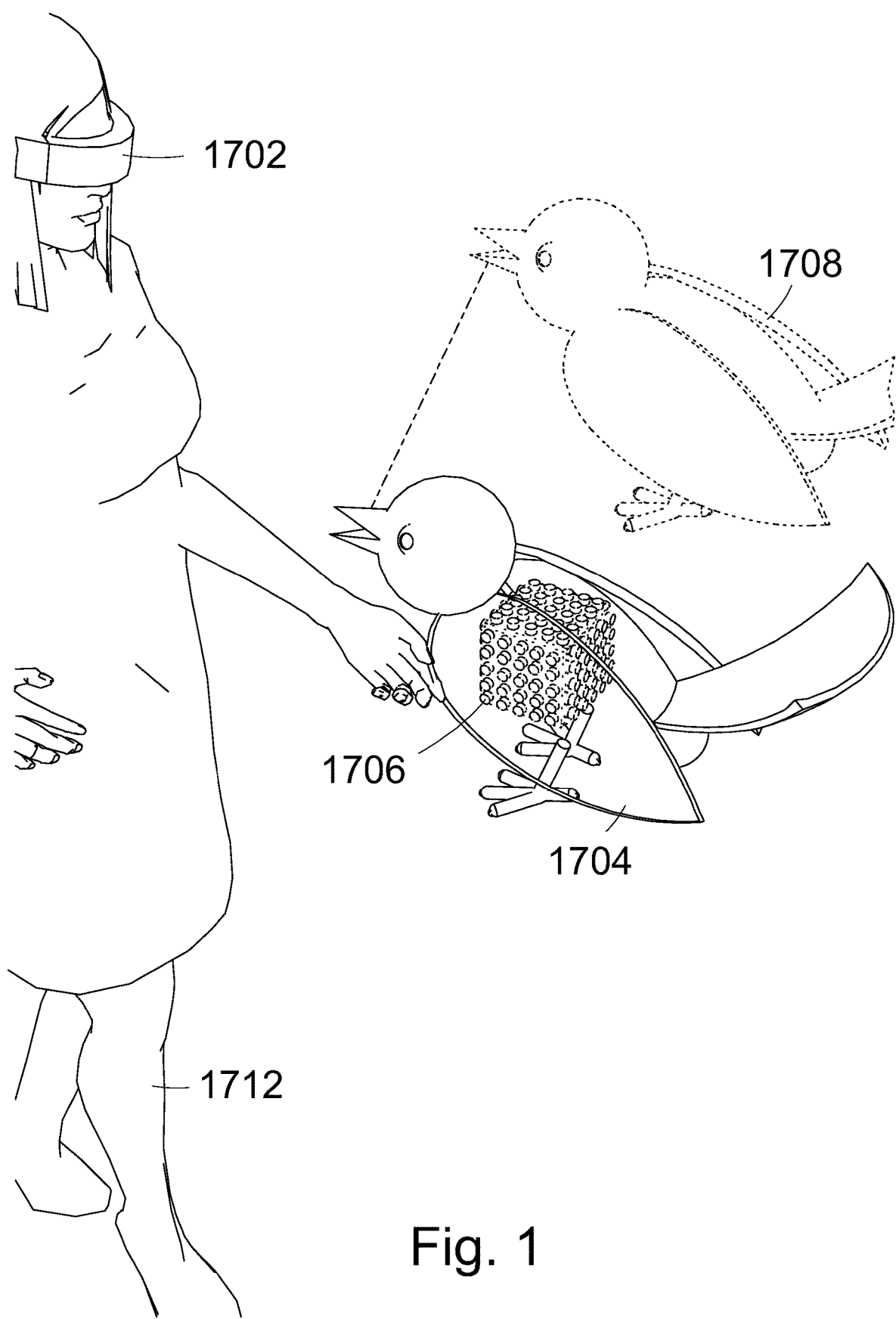
FIG. 1 shows a perspective of view a hologram, a transducer array, and mid-air haptic touch.

A three dimensional 3D transducer array is used to give mid-air haptic touch to a hologram, as shown in FIG. 1. The hologram is created by augmented AR reality glasses, or virtual reality VR glasses, or virtual reality VR glasses that has a camera a that show the environment, mixed reality MR headsets or glasses, that the glasses are in so the user can walk around in the viewed reality. VR replaces reality, taking you somewhere else. AR adds to reality, projecting information on top of what you're already seeing.

A transducer array 1706 can be three dimensional, with arrays shaped differently, such as, a ball, half of a sphere, a cube, a square based pyramid, a triangle-based pyramid, a cone, a cylinder, tetrahedron, and a cuboid. The transducers are on the outside of the shapes. Holograms 1704 can be pinned around the 3D array's shape. The triangle base pyramid can have an icon, on the upper surface of the pyramid, one side can have the number one, pinned to one of its top side surfaces. The next surface can have the number 2 pinned, to the next top side surface. Each number corresponds to an operation of a device.

The hologram is projected, onto the outside of the shapes, by the glasses. The shape is inside of the hologram, or the hologram overlays the shape.

A glasses camera 1702, which is part of the glasses, or separately located from the glasses, wirelessly connected to the glass's computer, positioned to view, where a user's fingers 1712 touch the holograms. The camera sends the information of the user's fingers in relation to the holograms, to the transducer's computer. The transducer's computer, directs ultrasonic feel, to where the user's finger touches the hologram, giving the hologram mid-air feel to the user's fingers. The holograms can also have feel, that is created by the sonic waves filling the hologram, or being in the same location as the pinned hologram.

The glasses supply the array computer with the shape of the hologram, or moving holograms, and the location of the holograms. The array computer then either fills in the shape with haptic touch, or has the haptic touch going to the edges of the holograms.

The glasses computer can also view when the user's finger is located at the beginning of the shape, and then direct ultrasonic waves, touch the location of the finger.

The glasses computer can also view where the user's figer is located contacting the hologram, and then direct ultrasonic waves, haptic touch the location of the finger's contact.

The display can be beamed on to the users' eyes, or retinas, from the glasses, by lasers, or other beaming devices, or can be viewed on the glass's lenses, or other displaying medium. virtual retinal display (VRD), also known as a retinal scan display (RSD) or retinal projector (RP), is a display technology that draws a raster display (like a television) directly onto the retina of the eye. The user sees what appears to be a conventional display floating in space in front of them. The display can also be shown on lenses of the glasses.

Two dimensional views from a camera can create, stationary, or moving three dimensional images, by using processes such as, artificial intelligence Al to take a 2D image and predict what the 3D image will be. Another technique is to use Al, to use an open-source library, that is previously developed to simultaneously construct a 3D geometric model of an environment, while encoding the likelihood that an object is, say, a chair versus a desk.

Complex patterns of ultrasound are focused to cause air disturbance. It is this property of ultrasound that is creates 3D haptic shapes in mid-air, users can feel those air disturbances on the skin. The patterns can be formed into 3D shapes This approach applies the principles of acoustic radiation force, whereby the non-linear effects of sound produce forces on the skin which are strong enough to generate tactile sensations. The user perceives a discernible haptic shape when the corresponding acoustic interference pattern is generated above a precisely controlled two-dimensional phased array of ultrasound transducers.

Storage

Computer program instructions may also be stored in a computer-readable medium that can direct a computer or other programmable data processing apparatus, to function in a particular manner, such that the instructions stored in the computer-readable medium produce a function of a device, including instructions which implement the function act specified in the flowchart and or block diagram block or blocks.

The computer program instructions may also be loaded onto a computer or other programmable data processing apparatus, to cause a series of operational steps to be performed on the computer, or other programmable apparatus to produce a computer implemented process, such that, the instructions which execute on the computer, or other programmable apparatus provide processes, for implementing the functions or acts specified, in the flowchart and or block diagram block or blocks.

The computer may further include on-board data storage, such as, memory coupled to the processor. The memory may store software that can be accessed and executed by the processor, for example. The host may be any type of computing device or transmitter including a laptop computer, a mobile telephone, that is configured to transmit data to the device. The host and the device may contain hardware to enable the communication link, such as processors, transmitters, receivers, antennas.

The computer readable medium may include non-transitory computer readable medium, for example, such as computer-readable media that stores data for short periods of time like register memory, processor cache and Random-Access Memory (RAM). The computer readable medium may also include non-transitory media, such as secondary or persistent long-term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, for example, or a tangible storage device.

Communication Links

The MR glasses computer may connect to the locally, over a network, or at a distant location over the internet. The MR glasses may be connected to a quantum cloud computer, to enable quantum cloud computing.

The glasses, may have a cell tower radio wave receiver, and transmitter, similar to a smart phone tower receiver, and transmitter. The tower receiver, and transmitter connect directly to cell phone tower receiver, and transmitter. The connection between the glasses and the tower allow the glasses to access the cell phone network.

Access to the networks allow the glasses to access data transfer from the network, access the internet, receive information from internet web pages, and allow the user to view, and send information to webpages. The user can also make phone calls, video chat calls over the cell network, and internet.

The communication link is illustrated as a wireless connection; however wired connections may also be used. For example, the communication link may be a wired link via a serial bus such as USB, or a parallel bus. A wired connection may be a proprietary connection as well. The communication link may also be a wireless connection, such as Bluetooth, IEEE 802.11 or wireless based communication links. In another example, the system includes an access point through which the glasses, may each communicate with the internet. In this example, the glasses, may not require connectivity to the host.

The access point may take various forms. For example, if the glasses, connects using 802.11 or via an Ethernet connection, the access point may take the form of a wireless access point (WAP) or wireless router. As another example, if the device connects using a cellular air-interface protocol, such as a CDMA or GSM protocol, the access point may be a base station in a cellular network that provides Internet connectivity via the cellular network.

As such, the glasses, may include a wired or wireless network interface through which they can connect to the access point. As an example, the device may be configured to connect to access point using one or more protocols such as 802.11, 802.16 (WiMAX), LTE, GSM, GPRS, CDMA, EV-DO, and/or HSPDA, wave2 Wi-Fi, Light Fidelity Lifi, Multi-User Multi-Input Multi-Output MU-MIMO, LTE-U, and Wi-Fi direct, among others.

Furthermore, the glasses, may be configured to connect to access point using multiple wired and/or wireless protocols, such as "3G" or "4G" data connectivity using a cellular communication protocol (e.g., CDMA, GSM, or WiMAX, as well as for "Wi-Fi" connectivity using 802.11). Other examples are also possible. Alternatively, the host may also include connectivity to the internet, and thus, they may access the internet through the host.

The glasses can have a light transmitter and light receiver in the glasses, which is connected to the glass's computer.

Different light can be used for communication, such as, infrared light, femtosecond light, light emitting diode light, visible light, and Light Fidelity (Li-Fi) visible light.

Programming

In addition, for the method and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer may run on an operating system. Various programming languages can be used to program the computer, such as, C++, C#, Java, PHP, JavaScript, Python, Objective-C, and Ruby.

Computer program code for carrying out operations of the object detection and selection mechanism may be written in any combination of one or more programming languages, including an object oriented programming language such as Java, Smalltalk, C++ or the like and conventional procedural programming languages, such as the "C" programming language or similar programming languages.

The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

The object detection and selection mechanism is described below with reference to flowchart illustrations and or block diagrams of methods, apparatus (systems) and computer program products according to implementations thereof. It will be understood that each block of the flowchart illustrations, FIG. 8, and or block diagrams, and combinations of blocks in the flowchart illustrations and/or block diagrams, can be implemented or supported by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Operational Software Flowchart

Figure 8:
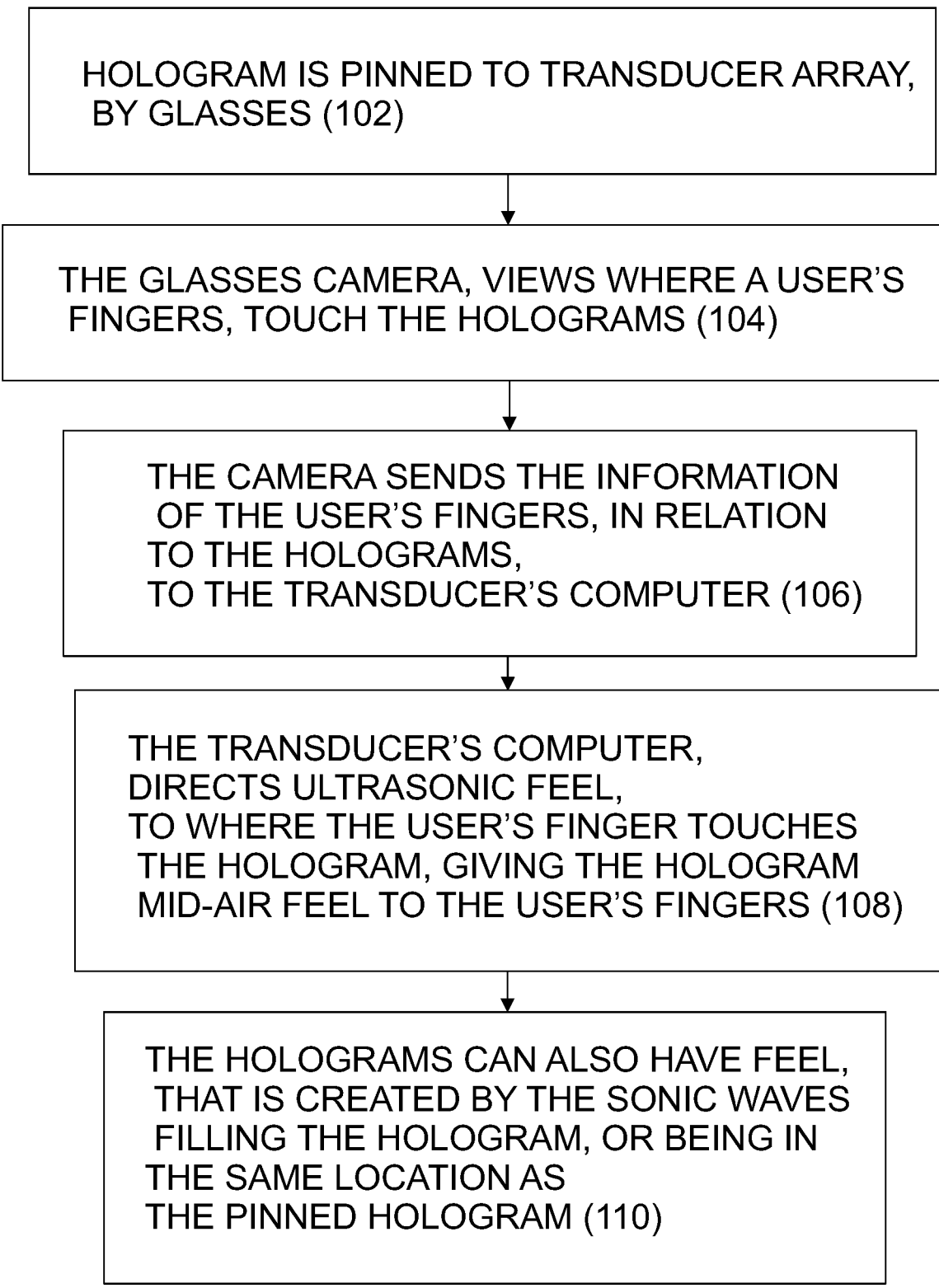
FIG. 8 depicts a flowchart of MR glasses' images occupying the same space, as midair feel.

Software steps of the glasses portable computer and external device's operation, may include some of the following steps In the device software and operation flowchart the following steps illustrate the glasses and external device's operation, as shown in FIG. 8, hologram is pinned to transducer array, by glasses (102), the glasses camera, views where a user's fingers, touch the holograms (104), the camera sends the information of the user's fingers, in relation to the holograms, to the transducer's computer (106), the transducer's computer, directs ultrasonic feel, to where the user's finger touches the hologram, giving the hologram mid-air feel to the user's fingers (108), the holograms can also have feel, that is created by the sonic waves filling the hologram, or being in the same location as the pinned hologram (110).

Block Diagram of Components

Figure 7:
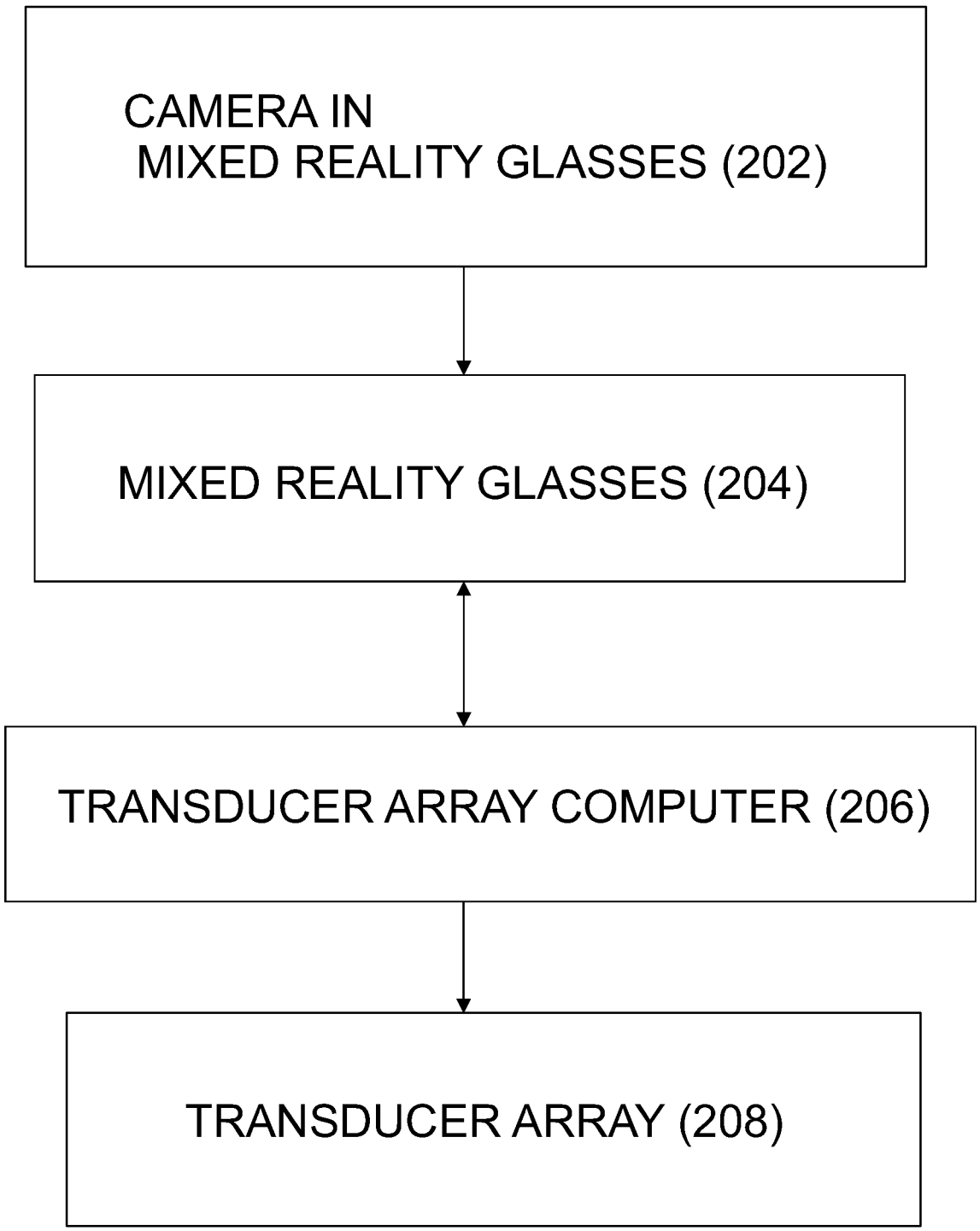
FIG. 7 illustrates a block diagram of hardware connections, between an MR glasses, MR glasses camera, a transducer array computer, and a transducer array.

A block diagram of the midair touch for MR glasses images, as illustrated in FIG. 7, camera in mixed reality glasses (202), mixed reality glasses (204), transducer array computer (206), transducer array (208).

The communication between the glass's computer, and the computers in the external devices, may use, a computer language and a computer connection that allows the devices to communicate. A communication software programmed into the glass's computer, and external devices computers, which is compatible between the glass's computer and external devices, is used for communication. The communication software enables the glasses computer, and external device's computer to communicate, with each other.

The glasses computer, and external device's computer uses standardized software enabling the communication between the glass's computer, and the external devices. There is a convergence of the glass's computer, and the devices computer software, allowing the ability to communicate between the glasses' computer and the external devices. The glasses computer, and devices use a universal software platform of software, and hardware, which allow the devices to communicate with the glass's computer.

In addition, the method, other processes and methods disclosed herein, the flowchart shows functionality and operation of one possible implementation of present embodiments. In this regard, each block may represent a module, a segment, or a portion of program code, which includes one or more instructions executable by the glasses, and devices processors for implementing specific logical functions or steps in the process.

Figure 4:
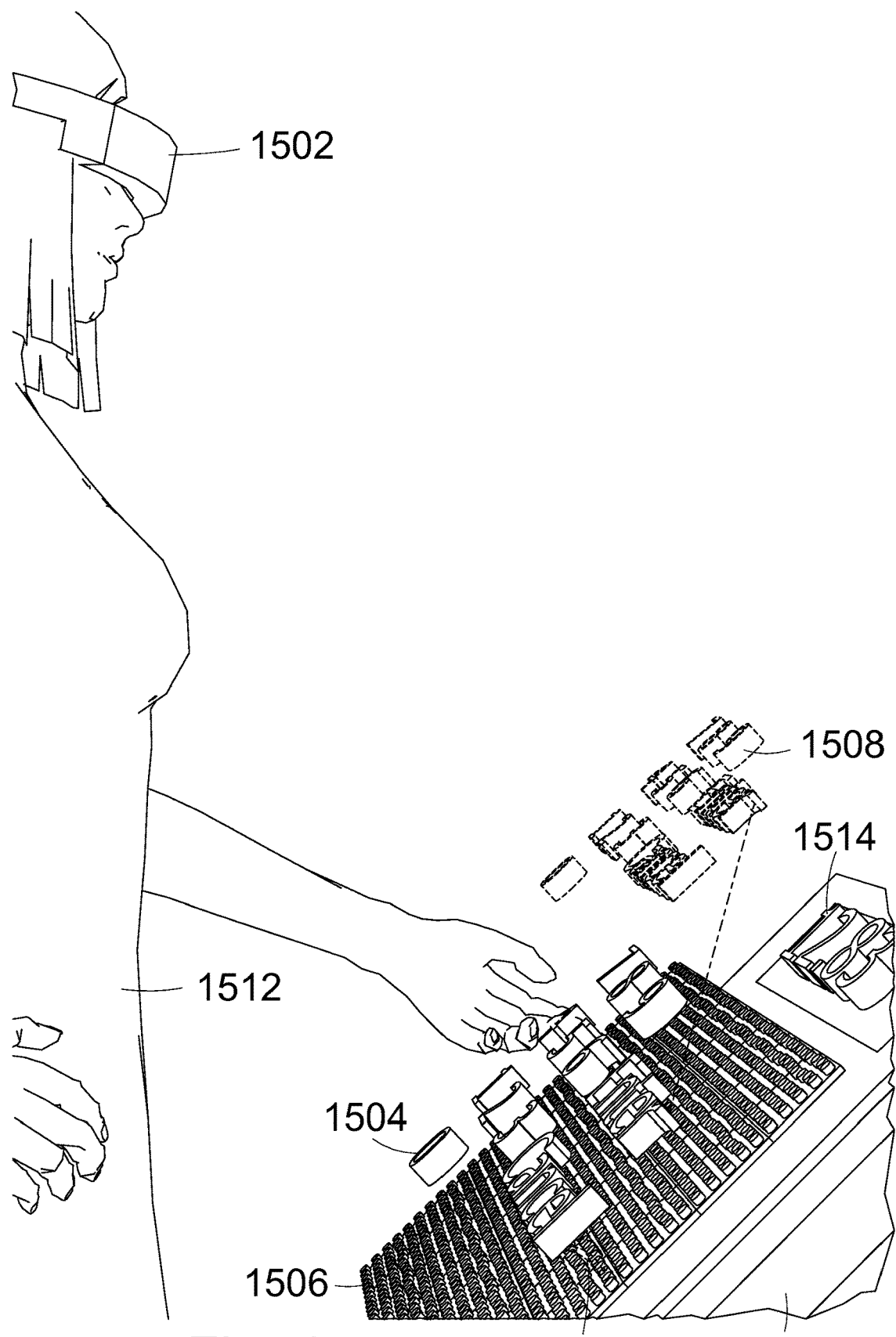
FIG. 4 shows a perspective of view a holographic store checkout touch input panel, mixed reality MR glasses, and a transducer array.

Mid-Air Haptic Touch Corresponding to Store Checkout Hologram Input Icons Description and Operation A store checkout payment station 1502, uses an ultrasonic transducer array 1506 to create feel for holograms pinned to the array, in mid-air as illustrated in FIG. 4. The transducers are connected to a motor controller (not shown) which supplies power to the transducers. A computer (not shown) is connected to the motor controller.

The transducers produce ultrasonic waves, that are directed outward into the air, from the transducers. The waves are felt by in mid-air by a user's fingers. The computer directs, a turning on, and off, strength, length, duration, frequency, amplitude, and power, of the waves from the transducers.

The computer directs the motor controller, to supply power too different transducers to create different mid-air haptic touch, or feeling in mid-air. Mixed reality MR glasses 1502 pin holograms 1504, to the array, when the glasses are in view of the array.

The computer communicates wirelessly, with a computer in the glasses. The wireless communication, can use radio waves, laser light, or infrared light. The holograms are located near the array, to allow the transducer's mid-air touch, to occupy the same space as the hologram.

The MR glasses computer sends the transducer's computer, the coordinates of the holograms, located near the transducers. Software in the computer signals the transducers to create the mid-air feel in the same space as the pinned hologram.

The location that the holograms are pinned to, the shape of the holograms, orientation of the holograms to the pinned location, is sent to the transducer's computer. The transducer computer use's location, orientation, and shape information of the hologram, to create mid-air haptic feel in the same location as the hologram.

The area that the user touches, is viewed by cameras in the glasses, or hand gesture recognition sensors, and by cameras (not shown) attached to the array. The computer signals the transducers, to send out waves, to create feel on the area of the hologram, that the user touches. The feel is created by the waves. The user feels touch from the hologram, on all of the 3D surfaces, that the user touches.

The holograms are pinned to a location above the array, and the shape, and orientation of the shape to the array is sent to the computer. The computer then sends waves to occupy the same space as the hologram. The Global Positioning Coordinates GPS coordinates of the hologram, are sent to the computer, and the waves fill in the shape of the hologram, as the user touches different surface areas of the shape.

The station calculates the price of the products, and sends the price, to glasses, and the glasses show the price displayed 1514 in midair or pinned to a location, such as, near the station. The glasses computer could also communicate with a product scanner, and calculate the price, and display the price holographic ally in mid-air.

The cameras in the glasses, views the user's fingers as they touch the hologram. The visual detection of the touch of the hologram, is an input of the touched hologram. A holograms display 1514 shows the letters, and icons that have been typed, and are being typed. The typed letters can also be free floating, and viewed by the user.

The feel of the holograms, can be different at different times, such as, buzzing in the morning, soft oscillating waves in the evening, tingling during a party, and snowflakes falling during new years' eve. The icons pinned to the array, are positioned to be within touch of the user.

Mid-air haptic touch shares the same pace, as input icons. The input icons are pinned to the transducer array. Each hologram has a unique feel, such as, the number 1 can give a hard feel, the number 8 can give a soft feel, the number 5 can have an oscillating hard to soft feel, the number 6 can have a tingling feel, the number 7 can have a buzzing fell, the number 8 can feel like sand paper, the number 9 can have cool temperature feel. Other feels can be warm, hot, smooth, ruff, grooved, rubbery, hairy, pointy, and plastic.

The haptic computer, sends the user's MR headset computer information, that the icons are pinned to the array. The headset computer creates the view of the input icons, pinned to the array. The MR computer can also send the transducer array computer, the layout of the icon which are pinned to the array. The MR computer can view the array, and contact the array computer to communicate the icons position, on the array.

The user can change the icons position on the array, for example, the icons for the store pay station, can be numbers 0-9, enter, cancel, change number. The array can be different shapes, such as, round, oval, triangular, shaped like a profile of a duck, rectangular, octagonal, and curved.

Figure 5:
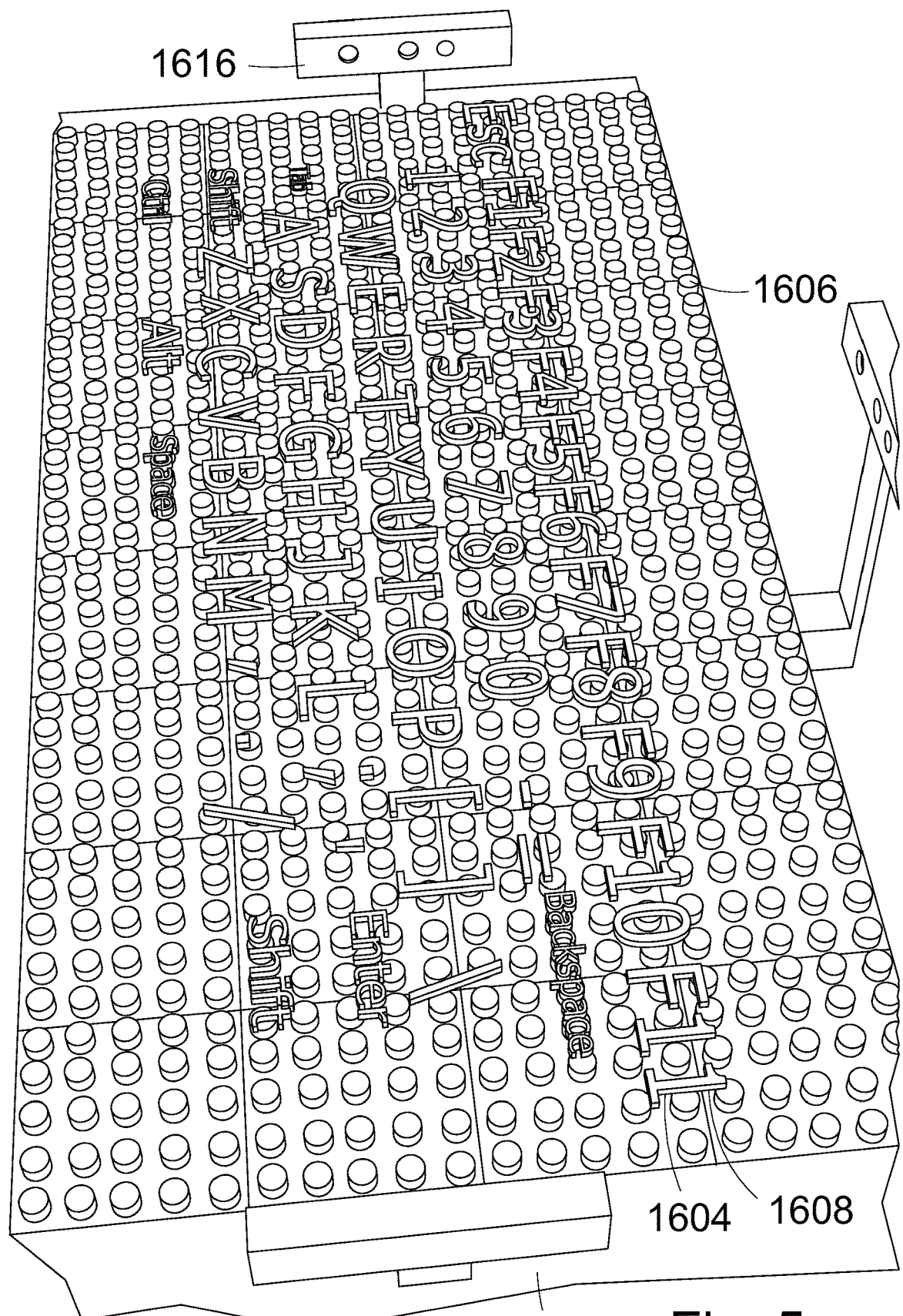
FIG. 5 shows a perspective of view a holographic keyboard, and a transducer array.

Mid-Air Haptic Touch Corresponding to Keyboard Key Icons Description and Operation The cameras 1616 in the glasses, and cameras adjacent to the keyboard 1610 view the user's fingers, as the user's fingers touch a hologram 1604, as illustrated in FIG. 5. The holograms are 3 centimeters above, a transducer array. The visual detection of the touch of the hologram, is an input of the touched hologram. A hologram display (not shown) shows the letters, that have been typed, and are being typed. The typed letters can also be viewed, on a physical electronic display.

The letters can give the same feel 1608, as letters typed on a physical keyboard, such as, the surface feel of the letters, the resistance when pressing the letters, the stop feel, when the letters are pressed all the way.

Body Sized Transducer Array Description and Operation

Figure 6:
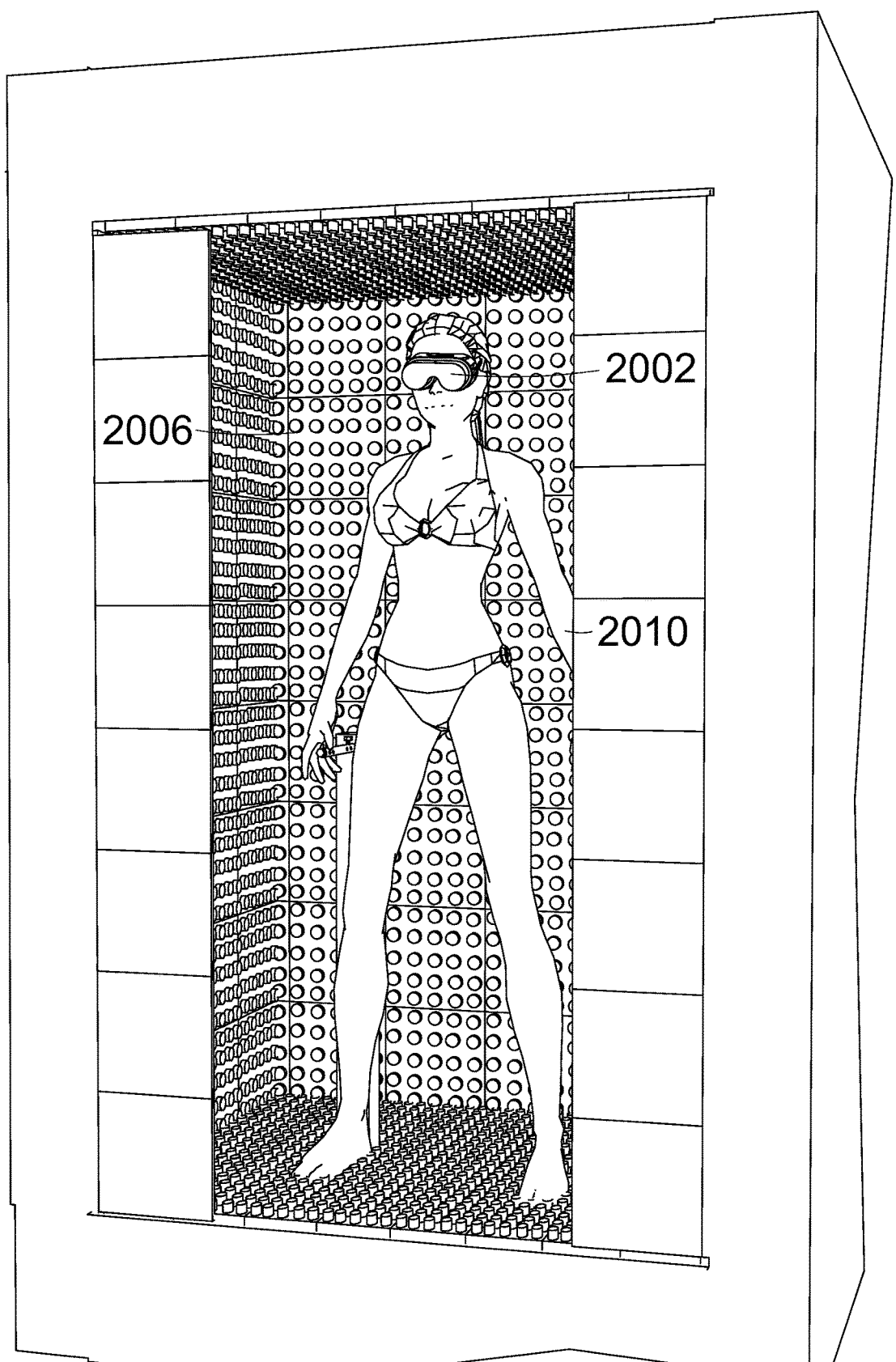
FIG. 6 shows a perspective of view of a full body transducer array, and MR glasses.

A body sized transducer array 2006, is used to deliver mid-air touch, to a user's body 2010, as depicted in FIG. 6. The user feels mid-air touch, over their whole body. The user feels mid-air touch shapes, associated with visual shapes, seen in the mixed reality glasses 2002. The user can touch the shapes with their hand, and also change the visual, and touch shape of the object. A hand gesture recognition sensor, or camera in the headset, views the user's hands in mixed reality.

Wearing a minimal number of clothes, allows the haptic touch to contact the body, more efficiently. The user can support themselves, by holding a hand rail. The user can also sit on a chair, inside the arrays, while feeling mid-air touch shape, and viewing mixed reality I reality shapes.

The glasses are wirelessly connected, to a transducer computer. The transducer computer, is connected to the array, and the internet. The computer is connected to a motor controller. The motor controller is connected, to the array. The computer has software, for signaling the motor controller, to send electricity to the transducers. The electrically powered transducers, create ultrasonic waves, which create the mid-air feel.

Figure 2:
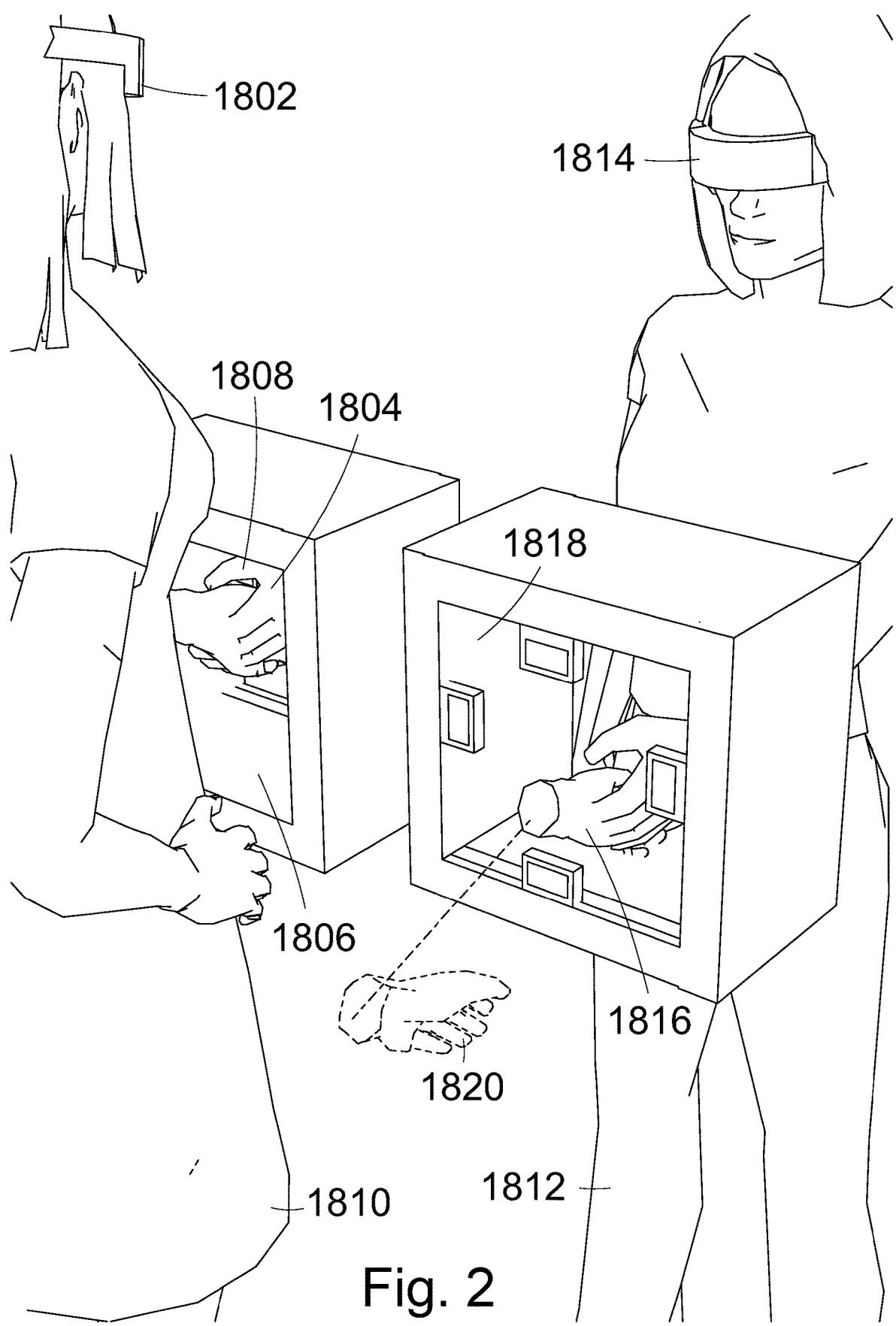
FIG. 2 shows a perspective of view of two transducer arrays, two mixed reality MR glasses, and mid-air haptic touch.
Figure 3:
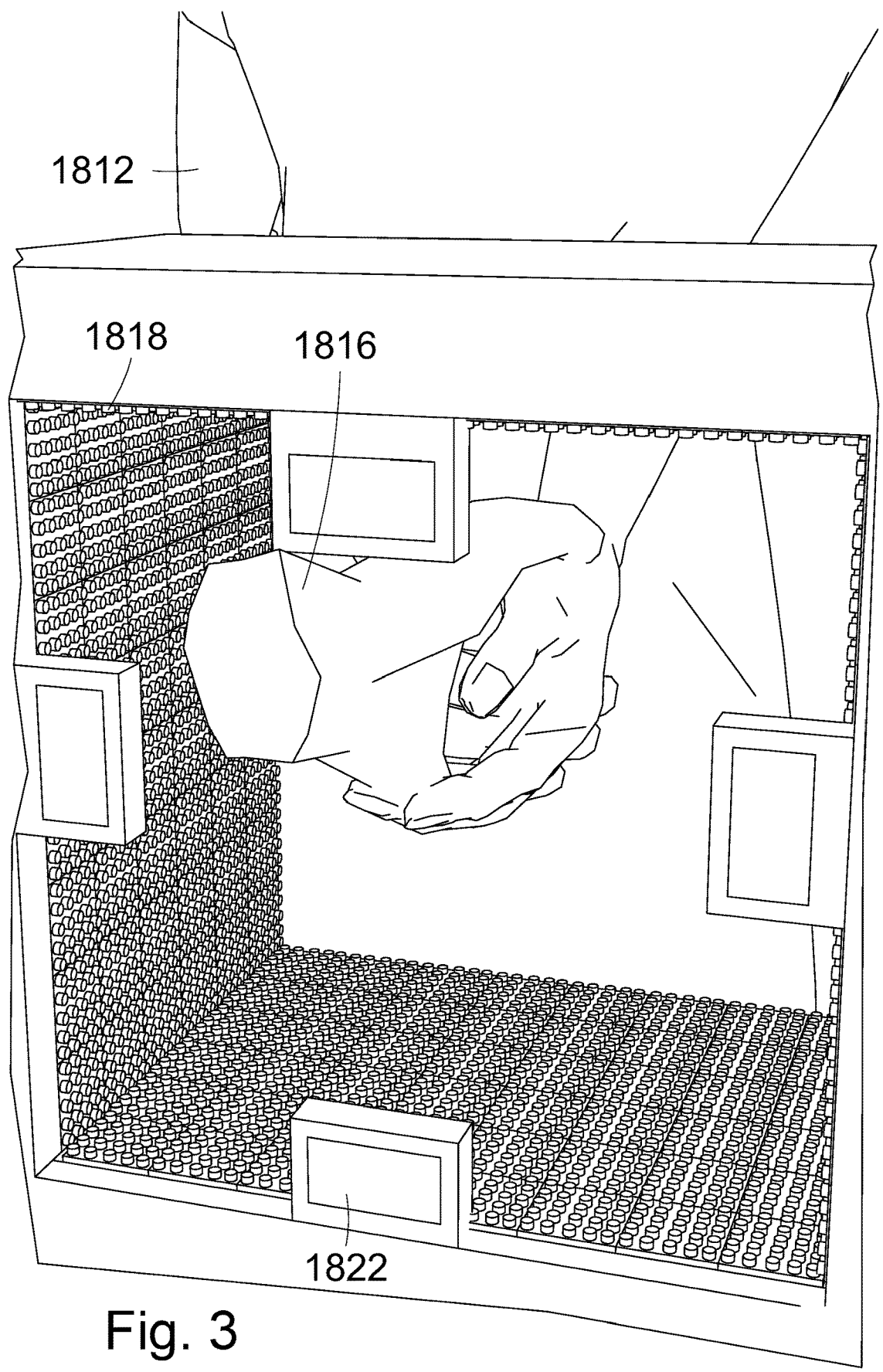
FIG. 3 shows a perspective of view a transducer arrays, mixed reality MR glasses, and mid-air haptic touch.

Two Users Touching the Other User's Touch Feedback Hologram Description and Operation Two users 1810, 1812 each send, a holographic avatar of themselves, over the internet, to the other user, as illustrated in FIGS. 2, and 3. Each user views, the other user's avatar, though MR glasses 1802, 1814. Each user feels mid-air haptic touch 1808, 1820 associated to the other user's hologram. The touch is created, by a transducer array 1806, 1818, on which the hologram is pinned. The users simultaneously interact, with each other's hologram, as the users would, if they were both physically touching each other, such as, shaking each other's hands.

Two computers connect to each other over the internet. Each glass connects, to their own computer wirelessly. Each array connects to their computer. A microphone, and speaker, are connected to the glass's computer, in the headset, which allows the users to speak to each other, and hear each other, over the internet.

Creating 3D Feel OF Holograms

Four gesture recognition sensors, cameras are connected to a computer. The sensors have a view of the user, near the arrays. The cameras are attracted, close to the arrays.

The location that the hologram is pinned to, the shape of the hologram, and orientation of the shape of the hologram, to the pinned location, is sent to the transducer's computer. The computer use's location, orientation, and shape information of the hologram to create mid-air haptic feel, in the same location as the hologram. The area that the user touches is viewed by the camera in the glasses, and by cameras 1822 attached to the array. The computer signals the transducers, to create feel, on the area of the holograms, that the user touches. The user feels touch, from the hologram on all the of the 3D surfaces, that the user touches, feel which is created by the transducers, and computer.

Four arrays, are connected to the computer. The bottom array creates, a top mid-air feeling for the object. The array projects the ultrasonic haptic mid-air touch feel perpendicular, from the face of the array. The top array creates, the bottom feel of the object. The left, and right array creates, the left, and right touch sides of the object. A combination of bottom array, and left side array can be used to create feeling for the object. All 4 arrays also can be used to simultaneously, to create feeling for the object.

The computer is programed with mid-air touch creating shape software, mixed reality software, visual image and mid-air touch shape movement synchronization software, mid-air hand gesture recognition software, and computer operating software.

The glasses and the haptic touch transducer array, are combined to allow a user to view, and feel 3D images, on a display in the glasses. Mid-air ultrasound created shapes, are associated to, and similar to the images. The displayed 3D images, 3D objects are located near the transducer array.

A computer first creates the visual 3D objects, and secondarily creates haptic touch, in mid to add touch feel, to the objects. The computer could also reverse, the creation of the touchable holograms, by first creating the mid-air touch shape, and then super imposing the displayed 3D object, on the touch shape. The computer could also simultaneously, create the visual objects, and mid-air touch shape. The touch shape moves in sync, with the visual 3D shape's movements.

The headset can view stationary, and moving objects, in mixed reality, and 3D environments. The user can use their fingers to interact with, and touch the holograms, such as, moving them, feeling their movements, and feeling their weight. The user can interact with other user's avatars, over the internet. The user can feel the other user's avatars, by positioning them near the array. The users can touch each other avatars, and simultaneous receive, touch and visual feedback.

Three dimensional cameras can be used to view, and to create 3D models of locations, such as, rooms, people, a bird, and objects. Three-dimensional 3D cameras, maps 3D spaces of rooms, which avatars can move in, view, and interact in the room.

3D Art Galleries

The user can create holographic sculptures, holograms, paintings of objects, photographs of objects, objects in animation, objects in computer games, and objects can be created. Objects can be created by the user Objects can be created by the user, by changing the shape of a pliable object, by changing the shape of an object in mid-air, with the user's hand.

The user can use a 3D modeling computer program for a wide range of drawing applications such as architectural, interior design, civil and mechanical engineering, film, and video game design, to produce models, that can be viewed as holograms. The hologram models can be positioned near an array, and the user can feel haptic touch when touching the models.

Holograms can be created by using the menu that has commands that allow for changing the hologram, such as, enlarging, removing part of the hologram, adding parts to the hologram, change colors of the hologram, like, blue, orange, green, yellow, and purple, Environments, websites, on the internet, can be created where user created objects, are displayed and touchable by other users. The users would go online, to the website, view the holograms near an array, and download and display them near an array, or display, to feel the haptic touch associated to the displayed hologram models.

Moving Holograms

The mixed reality displayed environment, can be limited to the area near the arrays. The user can touch and feel objects, move objects, zoom in and out on objects, enlarging or making the object smaller, changing the shape of objects, cutting objects, and combining objects.

The displayed environment can also be the area outside of the array, with the array used for creating mid-air touch for objects that can be placed near, the array, by the user picking up the object and placing it near the array. Objects can also be placed near the array, by the mixed reality world changing its location, and the array staying stationary, for example, if the user moves a pumpkin in the mixed reality world, the pumpkin's location in the world may be moved to the array.

The mid-air touch is associated to what is near the array, for example, if a strawberry is receiving mid-air touch, the user can touch the whole strawberry. If the strawberry is enlarged to where only a portion of the visual strawberry is near the array, the user can touch the part of the strawberry near the array. The feeling of the strawberry, would change to that of what the enlarged strawberry would feel like.

Changing the Shape of the Holograms

The user's hand, or other body part can be used, to interact with 3D visual mid-air touch objects. The hand is able to touch and feel objects, move objects, zoom in and out objects, enlarging or making the object smaller.

The user can input commands on a keyboard, or mid-air hand gestures, to change the shape of an object. The user activates an object shape changing mode, the object can stay stationary, and the user can use the avatar to contact and pull or push the object, to indent, compress, or pull, or elongate an area of the object.

A display menu can show a menu of display functions. The functions can be activated by touching the function with a user movable avatar.

In object material removing mode, material can be added or removed, by the avatar grasping a part of the object to be removed, and moving it away from the object, detaching it from the object. To change the objects shape, detached material can be added by replacing it the removed area, or in a different area.

Objects can be combined to change their shapes. The objects are put in combining mode. Two or more objects can be place together, touching each other. The objects are fussed, joined together, where they touched, when the combing mode is exited. An object cutting tool can be used to cut, and separate an area of the visual image of the object A displayed menu, the menu shows icons that display a description of what the icon is associated to, such as hand, or avatar. With hand activated, the hand interaction with a displayed hologram effects the hologram. With avatar activated the avatar interaction with the displayed hologram effects the hologram.

The menu icon is activated by either finger contact of the icon, or an avatar Cs contact of the icon. The avatar's movement is controlled by the user's hand movements. is interacted with by the menu has avatar, nor hand contact displayed. When hand contact is Once either hand or avatar is activated, the menu, describes, inputs that effect contact with the hologram in different way, such as, activating a displayed command like, move, would enable the hand contact to move the hologram from its pinned location to be pinned to another location, by the fingers grasping a part of the hologram, which releases it from being pinned, and moving to another location, where it is pinned by the hand being opened, and releasing the grasp Other commands include zoom in which make the hologram bigger when two finger touch the hologram and move away from each other. Command zoom out in which make the hologram smaller when two fingers touch the hologram and move toward from each other.

More Changing the Shape of the Holograms

Displayed change shape command finger contact, or avatar contact with the hologram, will indent the hologram if the finger is move inward, or stretch it of the finger is moved away from the hologram.

In object material removing mode, or command, displayed, when activated, material can be added or removed, by the avatar, or user's hand grasping a part of the object to be removed, and moving it away from the object, detaching it from the object. The detached material can be added by replacing it the removed area, or in a different area, or discarded, deleted. To change the objects shape, detached material can be added by replacing it the removed area, or in a different area.

In displayed combining command mode, objects can be combined to change their shapes. The objects are put in a displayed combining mode. Two or more objects can be place together, touching each other. The objects are fussed, joined together, where they touched, when the combing mode is exited. The joined together holographic objects create a new third hologram. The joined together can undone, by returning the hologram to the past state, by using an undo function.

In an icon displayed cutting command, when activated, where the user's finger, or avatar, contacts the hologram, cuts the holo, perpendicular, or the user' can change the angle of the cut, to the point of contact of the finger with the hologram, The cut cuts the hologram all the way thru, once the hologram is cut the separated pieces, can be moved by activating move mode.

Moving holograms can be created by activating a displayed moving icon. The hologram is pinned to an array. The user moves a part of the hologram by contacting a part of it with their finger. The hologram part moves as the finger moves. The movement is remembered by the glass's computer. The remembered movements the hologram is played back, and the hologram move the same as when being recorded moving. The movements can be in a loop that repeats. The movements can be for periods of time, like, minutes, hours, or days. The feel moves with hologram, is felt by touch of the hologram when out of moving mode.

Moving holograms can also be created by converting 2d video, to 3d video, using hardware, and software conversion devices.

Holograms for Health Diagnosis

A health care provider, can view and feel the inside of a patient's artery. The provider, using the avatar, can indent displayed plaque inside the artery. The provider can remove plaque, and an artery stent can be placed inside the artery. The provider can feel, and view how the change to the artery, effects the feel, and view of the artery.

Viewing mixed reality through the headset glasses, can provide a surgeon with information, which are otherwise hidden, such as showing the heartbeat rate, the blood pressure, the state of the patient's organ, and feel of the patient's body.

Medical providers can operate robotic surgery machines, over the internet, performing surgery on a patient. The surgery provider can mid-air touch feel the operation of the robotic hand input devices, and feel the input devise inter action with the patient's body. The provider can also hold and operate mid-air touch tools, and feel the tools, and with the patient's body.

Different Feel of Holograms

The haptic touch array creates mid-air touch that give mid-air feel shape similar to the visual 3D, mid-air hologram object's shape. The mid-air touch can also create the mass; weight feel of an object. The temperature of an object can be simulated. The movement of an object can be felt by the user.

Objects may be another user's hand, which can be shaken in mid-air, mid-air holograms creatures, and 3D mid-air avatars from online player worlds. Objects can be from locations, such as, 3D pyramids, Stonehenge, the Great Wall, the Moon, and Mars. Objects can be locations, such as, mid-air holograms of museum's collections, mid-air holograms of the Smithsonian or Louvre museums art, mid-air holograms from an Earth map, providing 3D mid-air views of travel destinations, locations around the world, 3D mid-air views of medical patients' bodies, 3D views of and mid-air touch inside an engine, moving holograms of people's faces, and bodies.

Two computer avatars can interact, and exchange user data with each other, such as, their names, location, age, and phone number. A multiple of moving avatars, such as 5 or more user's computers avatars, could be connected to each other, and can interact with each other.

Computer Identifies Objects

The computer identifies objects by code in the object that tells the computer what the object is. For objects that don't have computer code, the computer can use object recognition to identify the object, for example, the avatar touches a table, the object recognition software identifies the table, and creates a table shape. The table shape can be moved. The space left in the picture, by the moved table, is filled in with visual information similar to the visual information surrounding the object A Shape Recognition Software A shape recognition software, identifies the shape of the object, and recreates the shape of the object. The glasses computer identifies the 2d shape of the object, and creates a 3d shape of the identified object. For example a view of a chair by a web cam is a 2d view of the chair, on a display is viewed in 2d, the glasses computer, uses the 2d view, to create a 3d view, which is then placed near the array, to give the 3d view or hologram, feel to the hologram.

Objects that are already holograms, retain being hologram, and the feel shape, is there when the hologram is positioned near the array.

Additional Way To Create A 3d Image From A 2d Image Using Robotic Technology

Robotic perception called spatial-Al, is used in robotics and large-scale virtual and augmented reality The new model, which they call 3D Dynamic Scene Graphs, enables a robot to quickly generate a 3D map of its surroundings that also includes objects and their semantic labels (a chair versus a table, for instance), as well as people, rooms, walls, and other structures that the robot is likely seeing in its environment.

The model also allows the robot to extract relevant information from the 3D map, to query the location of objects and rooms, or the movement of people in its path. A model of spatial perception is the first to generate a 3D map of the environment in real-time, while also labeling objects, people (which are dynamic, contrary to objects), and structures within that 3D map.

The key component of the model is, an open-source library that was previously developed to simultaneously construct a 3D geometric model of an environment, while encoding the likelihood that an object is, say, a chair versus a desk. A mix of mapping and semantic understanding in 3D.

Works by taking in streams of images from a robot's camera, as well as inertial measurements from onboard sensors, to estimate the trajectory of the robot or camera and to reconstruct the scene as a 3D mesh, all in real-time.

To generate a semantic 3D mesh, the system uses an existing neural network trained on millions of real-world images, to predict the label of each pixel, and then projects these labels in 3D using a technique known as ray-casting, commonly used in computer graphics for real-time rendering.

The result is a map of a robot's environment that resembles a dense, three-dimensional mesh, where each face is color-coded as part of the objects, structures, and people within the environment.

A Layered Scene

If a robot were to rely on this mesh alone to navigate through its environment, it would be a computationally expensive and time-consuming task. the system developing algorithms to construct 3D dynamic "scene graphs" from the system's initial, highly dense, 3D semantic mesh.

Scene graphs are popular computer graphics models that manipulate and render complex scenes, and are typically used in video game engines to represent 3D environments.

In the case of the 3D dynamic scene graphs, the associated algorithms abstract, or break down, the system's detailed 3D semantic mesh into distinct semantic layers, such that a robot can "see" a scene through a particular layer, or lens. The layers progress in hierarchy from objects and people, to open spaces and structures such as walls and ceilings, to rooms, corridors, and halls, and finally whole buildings.

This layered representation avoids a robot having to make sense of billions of points and faces in the original 3D mesh.

Within the layer of objects and people, the researchers have also been able to develop algorithms that track the movement and the shape of humans in the environment in real time.

2D Image and Predict Relevant 3D Properties

An artificial intelligence AI system that is capable of creating a 3D image from a 2D image. Machine learning is used to create an AI called DIB-R (Differentiable Interpolation Based Renderer). have trained the AI in multiple databases so that it can convert a 2D image into 3D image.

It can take just about any 2D image and predict relevant 3D properties. DIB-R can produce a 3D object from a 2D image in less than 100 milliseconds. This AI is going to be really helpful for making 3D games or Augmented Reality. The AI will make 3D printing a lot easier as it will give an idea to the printer what the output should be.

Additional Way to Create a 3d Image from a 2d Image

The following procedure can be used to make stationary, or moving holograms. A fast and effortless way to make a 3D model using 2D images. It can be compared to Bas Relief, one of the most ancient sculpting techniques that has been used throughout humanity for thousands of years. A bas relief sculpture involves cutting out the voids of an image from a flat surface, leaving behind artwork that appears to be raised above a solid background. After 3D model is made, it can be positioned near the array.

Upload an image you want to transform into a 3D object. For optimum results, the image should have a clear silhouette and a solid background, otherwise the background can form part of the relief and obscure the picture. If you want to use a photograph, be sure that it is well-lit with minimal shadows (the less shadows the better). Also, please note that if the image has too many details, the 3D model can look a little sloppy.

After uploading the image, a relief will be automatically generated. If you don't like the result, you can experiment with following features:

Select Relief Direction

This feature works based on the light in the image. If you want the light areas of the image to be sunken and dark areas to be raised, then you should select 'Light areas sunken'. If you want the light areas of the image to be raised and dark areas to be sunken, then you should select 'Light areas raised'.

Select Mode

This feature allows you to select between monochrome and colored. Monochrome uses only the one color and is recommended for standard desktop 3D printers and CNC machines. Colors, as its name suggests, uses all the colors from the image in the relief but can only be produced by full-color 3D printers.

Denoise Factor

The denoise factor can reduce visual distortions or the appearance of noise in images (e.g. splotches and discoloration) and make it more accurate for manufacturing.

Smoothness Factor

The smoothness factor can be compared to a blur tool in photo editing. It smooths edges and roughness, but some details may disappear as well. The greater the smoothness factor, the smoother the relief will be.

Quality

This feature allows you to choose the quality and size of the file: Small, Recommended and Extra. A small file will be ready instantly. The Extra file will take more time to prepare, but it will also give the best quality as well.

Additional Details of the MR glasses Holograms Having A Haptic touch Feel

Glasses display a hologram in midair, the hologram is viewed through the glasses, the glasses being augmented reality glasses, the hologram is at a location near an array, the array is a transducer array, the hologram is in midair, the array has an array computer, the array computer is connected wirelessly to the glasses computer, the array produces a touch feel in midair, the feel is located on the hologram where the user contacts the hologram, the feel is felt by a finger of the user where the finger contacts the hologram.

The glasses have a camera, the camera is positioned to detect a location of a user's finger's contact with the hologram, the feel is located on the hologram at the location that the finger is detected contacting the hologram. The feel is feel that can also fill in the shape of the hologram.

The hologram is pinned to the location near the array, the hologram stays at the pinned location near the array if the glasses change location.

The hologram can change shape, a change in the shape of the hologram is associated to the location of the feel moving with the changed in shape of the hologram, the feel moving can be felt by the finger in contact with the hologram.

The glasses are connected to an internet, an internet website is displayed, the camera views an image on the website, the image is sent to the glasses, the image is viewed as a three-dimensional image.

There is an avatar of the user, the avatar is sent from the glasses over an internet to a second glasses, the avatar is located in midair near a second transducer array, the second transducer array creates a second feel associated to touch of the avatar.

A second camera is connected to the second glasses, there is a second avatar of a second user, the second avatar is sent by to the second glasses over the internet to the glasses. the second avatar is located in midair near the transducer array.

The glasses have a wireless connection to an internet, an internet website is viewed in midair, a viewable object hologram is viewed on the website, the object can be copied, touch of the object highlights the object, an icon associated to copying a highlighted object is displayed, the icon is activated by a detection of the finger touching the copy icon, activation of the copy icon copy's the highlighted object, the copied object is viewed as a hologram, the hologram is displayed near the array.

The glasses have a wireless connection to an internet, an internet website is viewed in midair, images of stationary or moving objects is viewed on the website, the objects can be copied, touch of one or more of the object highlights the object, an icon associated to copying a highlighted object is displayed, the icon is activated by a detection of the finger touching the copy icon, activation of the copy icon copy's the highlighted object, the copied object is viewed as a hologram, the hologram is displayed near the array.

A plurality of holograms is displayed. A plurality of arrays, the arrays are positioned to create an enclosed area, the transducers on the array are located in the enclosed area, haptic touch is directed to the inside of the enclosure by the arrays.

A hologram can be created by the user, the hologram can be displayed on a website, users can access the website, the displayed hologram is viewable and touchable by the other users. The feel of the hologram is a feel similar to the feel associated to the image in reality.

The glasses connected to a device over the internet, an image of the device is displayed by the glasses, the device has input icons, the input icons are displayed, each icon is associated to activating one of the operations of the device, the camera is configured to detect hand contact with one of the icons, finger contact with one of the input icons activates the icon, the activated icon activates the device action that the icon is associated to, the activated device action influences the operation of the device.

The transducer array can have a three-dimensional shape. The hologram over lays the transducer array that has the three-dimensional shape.

The camera can also be hand gesture recognition sensor. An object can be viewed, the viewed object is identified by a code in the object the identified object is used to create a hologram whose shape is similar to the shape of the object An object is viewed, the view of the shading of the object is identified, the identified shading is used to influence the feel when the finger contacts the hologram.

An object recognition software is in the glass's computer, the object recognition software identifies an object in a view of the object, the identified object is used to create a shape of a hologram that is similar to the shape of the object.

The feel is a warm feel. The feel is a feel that has a weight feel.

An avatar is displayed, or the user's finger is detected, the avatar is moveable, the avatar's movement is associated to the movement of the user's hand. A menu is displayed, icons of the menu show different functions, each icon shows what function the icon is associated to.

One of the functions can be activated by contact of the avatar with one of the icons, one of the icons is shown as removing, activation of the removing icon is associated to the avatars contact with the hologram grasping the area that is contacted, movement of the avatar away from the hologram moves away the part of the hologram that is grasped.

A menu is displayed, icons of the menu show different functions, each icon shows what function the icon is associated to, an avatar is displayed, or the user's finger is detected, the avatar is moveable, the avatar's movement is associated to the movement of the user's hand, one of the functions can be activated by contact of the finger with one of the icons, one of the icons is shown as deleting, activation of the deleting icon is associated to the fingers contact with the hologram deleting the area that is contacted by the finger.

A menu is displayed, icons of the menu show different functions, each icon shows what function the icon is associated to. An avatar is displayed, or the user's finger is detected, the avatar is moveable, the avatar's movement is associated to the movement of the user's hand one of the functions can be activated by contact of the finger with one of the icons, one of the icons is shown as moving, activation of the moving icon is associated to the fingers contact with the hologram pining the hologram to the area that is contacted by the finger, the hologram will have the same movement as the movement of the finger, the hologram is unpinned to the finger by a second contact of the moving icon by one of the fingers.

Displaying a hologram in midair with glasses, comprising, the hologram with the glasses, with the glasses being augmented reality glasses, locating one of the hologram near a transducer array with the glasses computer locating the hologram near the transducer array, producing a touch feel in mid with the t transducer array, with the transducer array having an array computer, and the glasses computer connecting wirelessly to the array computer, having the touch feel on the hologram where the finger touches the hologram.

Painting A Hologram

An avatar is displayed, the avatar is moveable, the avatar's movement is associated to the movement of the user's hand, or the user's finger is detected, a menu is displayed, icons of the menu show different functions, each icon shows what function the icon is associated to, one of the functions can be activated by contact of the avatar with one of the icons, one of the icons is shown as a painting function, activation of the painting icon display a menu describing a plurality of different colors.

Contact with one of the described color, is associated to the contacted color being applied to the hologram when the hologram is contacted by the avatar, activation of the painting icon is associated to the avatar's contact with the hologram painting the area that is contacted with the color that is contacted, one of the icons is shown as a unpainting function, activation of the unpainting icon is associated to the avatars contact with the hologram removing paint from the area that is contacted. The paintable colors, include, green, yellow, blue, black, white, purple, orange and, red.

Joining Together Two Or More Holograms

A menu is displayed, icons of the menu show different functions, each icon shows what function the icon is associated to, one of the functions can be activated by contact of the finger with one of the icons, one of the icons is shown as moving, activation of the moving icon is associated to the fingers contact with the hologram pining the hologram to the area that is contacted by the finger, the hologram will have the same movement as the movement of the finger, the hologram is unpinned to the finger by a second contact of the moving icon by one of the fingers, one the holograms can be moved to contact a second hologram, when the hologram is unpinned form the finger while in contact with the second hologram the hologram and second hologram will fuse together to create a third hologram.

Copying A Highlighted Object

The glasses have a wireless connection to an internet, an internet website is viewed in midair, images of stationary or moving objects are viewed on the website, the objects can be copied, touch of one or more of the object highlights the object, an icon associated to copying a highlighted object is displayed, the icon is activated by a detection of the finger touching the copy icon, activation of the copy icon copy's the highlighted object, the copied object is turned into as a hologram, the hologram is displayed near the array.

MR Glasses Users Interacting

Real time 2D, or 3D cameras and displays can be used at locations in the world, and view real world objects and people. The cameras allow to people at the location, and mixed reality MR users on the internet to congregate and communicate with each other. Locations where people, and MR users on the internet, can go to, and meet each other, talk to each other, and can touch each other. MR users can meet other people on the internet, and go to a cafe and have a coffee anywhere in the world, and communicate with people at the location they go to. The MR user can have an avatar located at a location that is viewable, by other mixed reality users. The user can view the other user's avatars.

The users and their avatars can communicate with each other, using touch, visually, and audibly. The mixed reality users can communicate with people at locations, with displays, microphone, and speakers, at the locations. Locations where people, congregate may include, cafes, bars, taverns, restaurants, outdoor café, beaches, music concert halls, sports events, libraries, lectures, and class rooms. Cameras can be placed that allow people on the internet using mixed reality headsets, and displays, to communicate with people, at locations.

MR users and people at the location can interact with each other. People at the location, can view MR users, or the user's avatar on a display, or on MR glasses, or holographic projections. MR users can view the people, using cameras at the location. People and the user, can touch each other, using connected arrays. Users talk to each other, using microphones, and speakers. Users avatar's at cafés, can order mixed reality coffee, and food, which can be sold by the café. Mixed reality tables, can be set up for mixed reality users, to sit at.

An example of MR glasses user's, and people at a location could be, the user can, mixed reality travel to a casino and place bets on a dice betting table. The table can be set, to accommodate MR players. The table can have a screen, that shows where a MR player places their bets, or someone could place the bets for them. The MR traveler's face, or body, and face can be shown on a display, or holographic display, which users at the table can view. The MR user could choose, to be seen, or be invisible, by other mixed reality travelers, and people at the location.

Using A Machine Over the Internet

A dice throwing machine could be at the table, and connected to the internet, to allow the MR user to control the machine. The MR glasses user could throw dice using the machine. The dice machine can allow the MR glasses user to feel the dice rolling around in the dice machines hand, and be controlled by the hand movements of the MR user. Similar to the feel of dice, being shaken by people at the table. The MR user's presence, and actions at the table are the same as people at the table, except the MR user's body isn't physically present.

Users Connecting with Each Other

Business meetings can be held, with people at a location, and have mixed reality users also participle at the meeting's location. User can play online computer games, such as, online internet role playing games. Users can view, touch and feel touch objects, and avatars in the game. The view of each other user, is a hologram, is placed near individual arrays that each user has, which creates haptic touch when the user touches the hologram.

MR glasses which are connected, to the mid-air touch generating transducer arrays, can be used by the user, and other users with MR glasses, connected to the user, for the user to give, and receive sexual stimulation with other users. Visual and mid-air touch avatars, can be used by the user, or computer, or another user to direct genital stimulation at the user's genitals. Avatars can also be used, by users, to stimulate the other user's genitals.

Users can use the avatars to engage in simultaneous genital simulation, with each other user, over the internet. The array can be located near the user's genital's, to mid-air touch stimulate the genitals, by producing feelings similar to sexual stimulation, or other unique feelings made possible by the mid-air touch shapes.

A 3D printer can be connected, to the computer. The user can instruct the computer, to instruct the 3D printer, to print the 3D shape of the object. The printer prints, the 3D shape of the object, from received computer instructions. A 2D printer can be connected, to the computer. The user can print the 2D visual view, of the object.

Users with Augmented Reality Glasses Displaying Each Other's Holograms with Touch Description and Operation Communicating with Other Users Glasses The glasses can be set to detect other users, with glasses. The users can also broadcast too other user's glasses that they are available to communicate with other users, using the glasses.

Communicating users can each see, an avatar of the other user, in mid-air holographically, that moves similar to the user broadcasting the avatar. The users can each, broadcast their voice, and hear the voice broadcasts, of the other user.

The user can create an avatar of themselves. The avatar can be a photo realistic view of the user. The avatar could be an avatar, such as, a bug's bunny cartoon character, or a penguin. The glasses view the user's movements. The user's movement are transmitted to the avatar; the avatar moves similarly to the user.

Sharing Lunch

The glasses can view the user's surroundings, environment and send the images to a second user. For example, the first user can be eating lunch. The view of the dish, that the user is eating, can sent to the second user. The second user, can view the changes to the dish, as the first user eats the dish. The two user's view, each other, and their faces, as if the users were physically present, within each other's environment. The view of each other user, is a hologram, is placed near individual arrays that each user has, which creates haptic touch when the user touches the hologram. The surroundings of the other user, can be viewed by the user, such as, other people in the environment, the décor of the restaurant. The distance that the other view of user, is away from the user, can be set by each user.

Playing Ping Pong

Users can play games with each other, over the internet, while they are at different locations. Games, such as, ping pong, tennis, horse shoes, scrabble, card games, and board games. Each user can touch, the other user's hologram.

For example, one user sees the other user's avatar hit a ping pong ball on to a table tennis table. The ball bounces toward the user. The user positions a real, or mixed reality ping pong paddle, to hit the ball back to the other user. The other user sees the ball return, with the contact of the ball, off of the user's paddle. The ball is volleyed back, and forth between the users, until one of the users misses hitting the ball, the ball is hit to far from the table, or the ball contacts a net on the table.

Users Conversing

The user's verbally talk to each other using a microphone, and speaker in each pair of glasses. The vocalizations of the first user are detected by the first glasses' microphone, and sent to the second user's glasses speaker. The second user hears the first user's vocalizations produced, broadcast in the second user's glasses speaker. The second user sends vocalizations to the first user's, in the same fashion as the vocalizations sent by the first user to the second user.

Visual messages, and or videos can be sent by one user to another user. Messages can be text messages, or emoji's. Videos can be live, or pre-recorded videos, or single pictures.

Each user is connected to the internet; the users communicate with each other over the internet. Two or more users can view each other's avatars, talk and hear the other users simultaneously.

Separate cameras could also be used, to view each user. The cameras can connect wirelessly to the glasses. The images can be used to create an avatar of the viewed user. The user images, avatar and movement of the images of themselves, can be sent to the other user's glasses.

User Sending Other Users Holograms

The use can send another user, a hologram, or software application APP over the internet. The other user can be connected to, the user sending the hologram, or the hologram can be sent the other users, email, download file, social media applications, or messenger application. The user can download the hologram from the messenger application to the glasses, and view the hologram on their glasses.

3D Printing of Holograms

A 3D printer can be connected wirelessly to the glass's computer. The user can instruct the glasses, to instruct the 3D printer, to print a 3D shape of the hologram. The holograms information is sent to the 3D printer. The printer prints the 3D shape, of the object from the received computer instructions. A 2D printer can be connected the glasses computer. The glasses can instruct the 2D printer to print a 2D view of the hologram.

Mid-Air Haptic Touch Associated to the Touch of a Displayed Avatar Description and Operation A user can view on a display an object. A displayed avatar can be used to touch the object. A user can feel in mid-air a shape similar what the avatar is touching. The shape is associated, and similar to the surface what the avatar of touching. The mid-air touch shape allows the user to feel what the avatar is touching.

The avatar may be a depiction of a hand, or a pointer, which is shown on the two-dimensional 2D or three-dimensional 3D display. The user views the avatar on the display. A mid-air hand movement sensor, is used as a user input device to control the movement of the avatar. The sensor detects the movement of the user's hand's, and is associates the movement of the hand to the movement of the avatar. When the user's hand moves the avatar moves in sync with the hand. The user's hand moves in relation to the mid-air hand gesture recognition sensor.

A computer connected to a transducer array creates a mid-air haptic touch in the shape, of what the avatar is contacting. The mid-air touch array creates the surface of the object, which is touched by the avatar. The array creates pressure on the fingers of the user, when the user touches the shape. The shape is created perpendicular to the displayed object. The form, shape is similar to the shape of where the avatar is touching the object.

The user locates their hand near the transducer array, the array creating the mid-air feel. The user moves their fingers to a location perpendicular to the displayed object. The user feels the objects shape created in mid-air. The user can move their fingers over the different surfaces, of the object, and feel he different surfaces. The mid-air touch allows the user to feel, what the avatar is touching on the display.

The user can move their avatar on the screen 106 by moving their hand off of center from their location in relationship to the array. The avatar follows their directions movement. The avatars speed can be increased, by moving their hand further from the center point, and the speed decreased as the hand moves closer to the center point. When the avatar, is contacting a desired area of the object, the user makes a fist, which signals the senior to switch to object touching mode. In touching mode, the user's hand can touch the object without signaling the moving of the avatar. Other input devices can also be used to move the avatar, such as, a keyboard, a joy stick, a mind input controlling headset, and an eye gaze recognition device.

The user can touch, displayed stationary and moving images, such as, as touching a metal support of an Eiffel tower, or feeling a polar bear breathing while touching their fur. The user can feel the use of a tool such as a wrench to loosen bolt. Users can touch visual 2D or 3D scenes, on the internet, such as, images in map street view, or map of earth. Users can move around in online internet virtual 2D or 3D environments, and touch 2D or 3D objects, and touch other 2D or 3D avatars in the environment. Users can touch inside a real or virtual 2D or 3D product, such as, an espresso coffee machine. The machine can be made large, or the avatar can be made small, and touch and move around inside the machine. Viewing and touching inside the machine, could be used for machine production quality control, or increased design information about the machine, etc. The display can also be a virtual reality headset display.

Mid-air touch can be used by health care providers, such as, aiding medical patients. The health care providers can touch the 3D visualizations of the inside of a patient's body, such as, the patient's heart, brain, spleen, etc.

A user can view a scene from a web cam (not shown) connected to the internet. The user's avatar can move around within the web view, and touch objects within the scene. The touched objects can be felt in mid-air touch. A web cam can have a view, such as, a view of a street with-stores. The avatar 116 can touch a parked car, on the web cam street view, and the user can feel the different surface feelings, of the car. The user could feel water, from a water fountain, splashing on a user's hand, in the scene. The user can touch another user's displayed face, with the avatar hand. The user can feel the users face, in midair above the array.

The mid-air hand gesture recognition sensor is used to determine the position of the user's hands near the array. When the user is touching the mid-air shape, the hand position allows the computer to direct ultrasound at the right time and frequency to produce the sensation of touching different parts of the object, the top, or the side.

The computer signals the transducers to create touchable shapes in mid-air by activating some of the transducers in the array, and deactivating some of the transducers. The deactivation, and activation of the transducers creates an area where there is touch feel, and area where there isn't touch feel. The difference in feel is used to create the mid-air touch shapes. The feel can also be influenced by the frequency of the ultrasound waves. The higher the frequency of the ultrasound, the harder the feel of the form, and the lower frequency of the ultrasound the softer the feel of the shape.

The mid-air shape can also be created by continuously generating the mid-air shape, filling the object, with mid-air feel, creating the mid-air shape to be similar to the displayed shape.

The mid-air touch shape changes when the surface that the avatar is contacting changes. When the avatar moves while contacting an object, the mid-air touch moves with the movement of the contact. If the surface changes what the avatar is contacting, while moving, the mid-air touch will change its shape, to the new surface that the avatar is contacting.

The user moves their hand, in the air, near the array, and within view of the hand gesture camera, to control the avatar on the display. The camera detects the users hand gestures, in midair above the array. The computer instructs a motor controller, to energize different transducers, of the array to give the users hand, a midair touch feeling, near the array. The touch feeling corresponds, to what the user's avatar, is touching or being touched by, in the displayed scene on the display.

The display panel can also show individual number icons, or a menu of input items, or web pages, which can be touched in mid-air. Each differing icon, is associated with a different computer function. Each differing computer function could be can effect a different operation of a device. The finger's and associated avatar's contact with one of the icons, activates the icon, and activates the computer function associated with the icon. The display senses a user's finger contacting one of a plurality of midair display icons, in mid-air and on the display. The display interprets the finger's contact with the icon, as a touch input activation of the icon. The activation of the icon, activates the computer function associated with the icon. The display can also be a Qwerty keyboard, and or different touch input icons, etc.

The transducers are used to create the mid-air touch field. The computer, instructs the motor controller (not shown) to add power, to various transducers to create multiple localized points of feedback in mid-air. The transducers can produce sonic energy at various hertz Hz frequencies, to generate different feelings. Different HZ frequencies produce different feelings, such as 35 Hz produces a softer diffused feel, while higher frequencies, such as, 240 HZ produce more shaper, well defined, harder, pushing feel.

The computer (not shown) is connected to the display. The mid-air gesture recognition sensor is connected to the computer. The computer is a laptop computer. The computer connects to the internet using an internet router.

A 3D viewing screen, or using 3D glasses, can be used to view objects floating in mid-air with mid-air touch. Other alternate embodiments can use a 3D screen using 3D glasses, which can be worn to view avatars in 3D.

A variety of ways can be used to create the surface and movement feel, of two 2D or three-dimensional 3D objects. The viewed 2D or 3D objects may have preprogrammed touch information that can be sent to the user's computer from the computer creating the view of the displayed object. The user's computer can generate midair touch from the received preprogrammed object data. For example, preprogrammed information may include, what the object should feel like, such as, the computer identifying a displayed car in the 2D or 3D, mid-air holograms view. The web site or user, can preprograms how a car feels, and the car's various objects feel. When the user's avatar touches a part of the car the computer has the array generate the mid-air feel of the object.

Another way to create haptic touch from 2D or 3D, mid-air holograms viewed object is for the computer to use try to identify the surface textures of and object, and create those textures in midair above the array.

There are different ways the computer can generate the feel of an object. Images can have computer code in the picture that is activated when the avatar touches the object, the activated object signals the transducer array to generate haptic touch that allows users to feel the object with mid-air haptic touch. Another way is the computer interprets the different lighting and shading of a picture as differing mid-air touch. The differing mid-air touch is similar to the features of the object. Another way is the computer interprets differing 3D image's information into differing haptic touch. Another way is the computer interprets a pictures light textures as haptic touch. Another way is assigning and associating differing mid-air feeling to differing objects. The differing objects have the preprogrammed feeling can be embedded in touchable objects, for example, an avatar touching water will create a mid-air touch water feeling on the user's hand near the array.

Two or more glasses, and arrays with haptic midair touch and gesture recognition, can be connected together. Two users with mid-air touch systems, can connect over an internet, and can interact with each other simultaneously using touch, and visually. The users can connect using an internet connection. Visual data and haptic touch data to be transmitted over the internet. The computers can connect to an internet router using WIFI. Each display is viewable by their respective user. The displays can be connected to each other, over the internet, or other computer connections, such as, a local area network.

The user can feel a mid-air touch shaped hand, a second user's avatar hand touching their avatar hand. The two users can view, and feel each other's hands moving, and can shake simultaneously. The connected displays, allow users to have simultaneous touch interaction with each other, and with each other's avatars. The connected displays also allow users, to have simultaneous visual displayed interaction with each other. A microphone and speaker are connected to the computer. The other user's display also has microphones and speakers. The users can transmit vocal communication with each other using the microphones. The users can receive audio communication from each other using the speakers. The user can receive sound associated with computer generated objects, and avatars from the speaker.

Avatars can be used in computer gamers to feel other avatars, and objects. If the user's avatar is affected in the game, the computer creates the affected feeling in midair touch above the array. The computer sends touch midair feedback, when the use's avatar interacts with other user's avatars, and or with artificial intelligence avatars, with the in-game environment, and with the in-game objects, etc. Objects in the virtual environment may be, other avatars, waterfalls, trees, cheese cake, space ships, hair, earth quakes, wind, spoons, lightning, sand, heat, cold, and chocolate.

In another embodiment, a displayed object's mid-air touch hand shape can be created above a transducer array without using and avatar to touch the object. The mid-air touch hand is similar is shape to the displayed avatar hand.

A keyboard (not shown) is used to choose the object for creating it shape above the array.

The transducers can be arranged in a variety of alternate embodiments. The array can be arranged as an open box four-sided box, or a half sphere, or a tube with the transducers on the inside. The opening can allow a user to insert their hand into the box. The box allows the transducers to send ultra-haptic touch to all the surfaces of the user's hand. The mid-air touch can be felt three hundred and sixty degrees around the user's hand.

When the word connected is used, in the reference to the display's assemblage of electrical components, it's implied that the electrical components, are connected by electrical wire, and or information conducting, communicating wire. Other components may use other connections, such as, components which are attached by a physical connection, or connected by radio waves, etc.

A camera can also be used for three-dimensional 3D imagining, of the user's hand. Other three-dimensional cameras could be used, such as, and a hand gesture infrared sensor, etc.

Virtual Reality Headset Images Used with Mid Air Touch Description and Operation Four gesture recognition sensors; cameras are connected to a computer. The sensors have a view of the user near the arrays. The cameras are attracted close to the arrays. The view of each other user, is a hologram, is place near an array, which creates haptic touch when the user touches the hologram.

Four arrays, are connected to the computer. The bottom array creates a top mid-air feeling for the object. The array projects the ultrasonic haptic mid-air touch feel perpendicular from the face of the array. The top array creates bottom feel of the object. The left and right array creates the left and right touch sides of the object. A combination of bottom array and left side array can be used to create feeling for the object. All four arrays also can be used to simultaneously create feeling for the object.

The computer is programed with mid-air touch creating shape software, virtual reality software, visual image and mid-air touch shape movement synchronization software, mid-air hand gesture recognition software, and computer operating software.

A virtual reality headset and the haptic touch transducer array, are combined to allow a user to view 3D images on a display in the headset. Mid touch mid-air ultrasound created shapes are associated to and similar to the images. The virtual reality headset is used to view displayed objects. The displayed 3D images, 3D objects are located near a transducer array.

A computer first creates the visual 3D objects and secondarily creates haptic touch in mid to add touch feel to the objects. The computer could also reverse the creation of the touchable holograms by first creating the mid-air touch shape and then super imposes the displayed 3D object on touch shape. The computer could also simultaneously create the visual objects and mid-air touch shape. The touch shape moves in sync with the visual 3D shape's movements.

The headset can view stationary and moving objects, in virtual reality, and 3D environments. The user can use their fingers to interact with and touch the holograms, such as, moving them, feeling their movements, and feeling their weight, etc. The user can interact with other user's avatars over the internet. The user can feel the other user's avatars, by positioning them near the array. The users can touch each other avatars and simultaneous receive, touch and visual feedback.

Various virtual reality headsets can be used, to view virtual reality, and allow people to interact with the virtual space. A virtual reality headset, and a glass virtual reality display, and a cardboard cell phone virtual reality headset.

Three dimensional cameras can be used to view, and to create 3D models of locations, such as, rooms, people, a bird, and objects. The camera maps 3D spaces of rooms, which avatars can move in, view, and interact in the room.

Sculptures and objects can be created by changing the shape of a pliable object by changing the shape of an object in mid-air with the user's hand. Environments can be created where user created objects are displayed and touchable by other users.

The virtual reality displayed environment can be limited to the area near the arrays. The user can touch and feel objects, move objects, zoom in and out on objects, enlarging or making the object smaller, changing the shape of objects, cutting objects, and combining objects.

The displayed environment can also be the area outside of the array 404, with the array used for creating mid-air touch for objects that can be placed near, the array, by the user picking up the object and placing it near the array. Objects can also be placed near the array, by the virtual reality world changing its location, and the array staying stationary, for example, if the user moves in the virtual reality world a pumpkin's location in the world may move to the array.

The mid-air touch is associated to what is near the array, for example, if a strawberry is receiving mid-air touch, the user can touch the whole strawberry, if the strawberry is enlarged to where only a portion of the visual strawberry is near the array, the user can touch the part of the strawberry near the array. The feeling of the strawberry would change to that of what the enlarged strawberry would feel like.

A user's hand, or other body part can be used to interact with 3D visual mid-air touch objects. The hand is able to touch and feel objects, move objects, zoom in and out objects, enlarging or making the object smaller.

The user can input commands on a keyboard, or mid-air hand gestures, to change the shape an object. The user activates an object shape changing mode, the object can stay stationary, and the user can use the avatar to contact and pull or push the object, to indent, compress, or pull, or elongate an area of the object.

A display menu can show a menu of display functions. The functions can be activated by touching the function with a user movable avatar, or by touching with the user's finger.

In object material removing mode, material can be added or removed, by the avatar grasping a part of the object to be removed, and moving it away from the object, detaching it from the object. To change the objects shape, detached material can be added by replacing it the removed area, or in a different area. Objects can be combined to change their shapes. The objects are put in combining mode. Two or more objects can be place together, touching each other. The objects are fussed, joined together, where they touched, when the combing mode is exited. An object cutting tool can be used to cut, and separate an area of the visual image of the object Holograms can be created by using the menu that has commands that allows for changing the hologram, such as, enlarging, removing part of the hologram, adding parts to the hologram. The menu can activate change of colors of the hologram, like, blue, orange, green, yellow, and purple, with icon that display the different colors, with a color associated to each icon. For example, with the yellow color activated, where the user touches the hologram, the color yellow is added to the location of the touch.

For example, a health care provider, can view and feel the inside of a patient's artery. The provider, using the avatar, can indent displayed plaque inside the artery. The provider can remove plaque, and an artery stent can be placed inside the artery. The provider can feel and view how the change to the artery effect the feel and view of the artery.

The haptic touch array creates mid-air touch that give mid-air feel shape similar to the visual 3D, mid-air hologram object's shape. The mid-air touch can also create the mass, weight feel of an object. The temperature of an object can be simulated. The movement of an object can be felt by the user. Objects may be another user's hand, which can be shaken in mid-air, mid-air holograms creatures, 3D mid-air avatars from online player worlds. Objects can be locations, viewed thru web cams, or cameras, such as, 3D pyramids, Stonehenge, the Great Wall, the Moon, and Mars websites. Objects can be locations, such as, mid-air holograms of museum's collections, mid-air holograms of the Smithsonian or Louvre museums art, mid-air holograms from Earth websites, providing 3D mid-air views of travel destinations, and locations around the world, 3D mid-air views of medical patients bodies, 3D views of and mid-air touch inside an engine, and moving holograms of people's faces and bodies.

Two computer avatars can interact, and exchange user data with each other, such as name of the avatar, language that the user uses to communicate. A multiple of moving avatars, such as 5 or more user's computers avatars, could be connected to each other, and can interact with each other.

The computer identifies objects by code in the object that tells the computer what the object is. For objects that don't have computer code, the computer can use object recognition to identify the object, for example, the avatar touches a table, the object recognition software identifies the table, and creates a table shape. The table shape can be moved. The space left by the moved table, is filled in with visual information similar to the visual information surrounding the object Real time 2D, or 3D cameras and displays can be used at locations in the world, and view real world objects and people. The cameras allow to people at the location, and virtual reality users on the internet to congregate and communicate with each other. Locations where people, and virtual reality users on the internet, can go to, and meet each other, talk to each other, and can touch each other. Virtual reality users can meet other people on the internet, and go to a café and have a coffee anywhere in the world, and communicate with people at the location they go to. The virtual reality user can have an avatar located at a location that is viewable, by other virtual reality users. The user can view the other user's avatars. The users and their avatars can communicate with each other, using touch, visually, and audibly. The virtual reality users can communicate with people at locations, with displays, microphone, and speakers, at the locations. Locations where people, congregate may include, cafes, bars, taverns, restaurants, outdoor café, beaches, music concert halls, sports events, libraries, lectures, and class rooms. Cameras can be placed that allow people on the internet using virtual reality headsets, and displays, to communicate with people, at locations.

Virtual reality users and people at the location can interact with each other. People at the location can view virtual reality users, or the user's avatar on a display, or virtual reality head set, or holographic projection. Virtual reality users can view the people, using cameras at the location, etc. People and the user can touch each other, using connected arrays. Users talk to each other using microphones, and speakers. Users avatar's at cafes, can order virtual coffee and food, which can be sold by the café. Virtual tables can be set up for virtual users to sit at. Augmented Reality using the headset, can provide a surgeon with information, which are otherwise hidden, such as showing the heartbeat rate, the blood pressure, the state of the patient's organ, and feel of the patient.

An example of virtual reality user's and people at a location could be, the user can virtually travel to a casino and place bets on a dice betting table. The table can be set to accommodate virtual reality players, the table can be a screen that shows where a virtual reality payer places their bets, or someone could place the bets for them. The virtual reality traveler's face, or body and face can be shown on a display, which users at the table can view. The virtual reality user could can choose to be seen or be invisible, by other virtual reality travelers, and people at the location. A dice throwing machine could be at the table and connected to the internet, to allow the virtual reality user to control the machine. The virtual reality user could throw dice using the machine. The dice machine can allow the virtual reality user to feel the dice rolling around in the dice machines hand, and be controlled by the hand movements of the virtual reality user. Similar to the feel of dice being shaken by people at the table. The virtual reality user's presence and actions at the table are the same as people at the table, except the virtual reality user's body isn't physically present.

Business meetings can be held, with people at a location, and have virtual users also participe at the meeting's location. Medical providers can operate robotic surgery machines, over the internet, performing surgery on a patient. The surgery provider can mid-air touch feel the operation of the robotic hand input devices, and feel the input devise inter action with the patient's body. The provider can also hold and operate mid-air touch tools, and feel the tools, and with the patient's body. User can play online computer games, such as, online internet role playing games. Users can view, touch and feel touch objects, and avatars in the game.

Input devices can be created to operate different devices. One mid-air input device can be used for operating a variety for different device. For example, on a space station the mid-air input device can operate, the space station moving arm, and then in a different input configuration, the input device can operate the station camera mover. The mid-air input can operate many devices, without the need of having two or more different input devices. The visual device can be created in virtual reality, and the physical touch input device can be created using mid-air touch array. Almost any input device to operate one or more devices can be created.

Virtual reality headsets and mid-air touch generating transducer arrays, can be used by the user, and other users connected to the user, for the user to give, and receive sexual stimulation with other users. Visual and mid-air touch avatars can be used by the user, or computer, or another user to direct genital stimulation at the user's genitals. Avatars can also be used by users to stimulate the other user's genitals. Users can use the avatars to engage in simultaneous genital simulation, with each other user over the internet. The array 404 can be located near the user's genital's, to mid-air touch stimulate the genitals, by producing feelings similar to sexual stimulation, or other unique feelings made possible by the mid-air touch shapes.

A 3D printer can be connected the computer. The user can instruct the computer to instruct the 3D printer to print the 3D shape of the object. The printer to prints the 3D of the object from received computer instructions. A 2D printer can be connected the computer. The user can print the 2D visual view of the object.

A block diagram showing the connection of components of the headsets, and array's components may include, computer, virtual reality headset for viewing a displayed object, mid-air touch transducer array for generating a touchable mid-air touch shape similar to the shape of a displayed object, internet for connecting to other users with mid-air touch arrays, and virtual reality headsets, mid-air finger gesture recognition sensor for directing a mid-air touch feel, to a user's fingers that touch an area of a mid-air touch object, user input device for moving a displayed avatar to touch a viewed object, mid-air touch input device for operating a device, mid-air touch input device for activating a computer function, input device for grasping an object, input device for elongating or indenting and object, 3d printer for printing a displayed 3d object, input device for cutting and separating an object, and computer code associated to an object at an internet location, for the touched object to create mid-air touch.

In the software and operation flowchart description of the headset, and array, the following steps illustrate the headsets, and array's software's operation, user views object on virtual reality headset display, user grasps object with visual avatar, avatar moves object to mid-air touch array, and user feels shape of object where hand touches mid-air shape.

A more detailed software flow chart, with the following steps, user's hands are associated to a visually displayed avatar, visually displayed object is touched by avatar, and felt in mid-air by user's hand near mid-air touch array, mid-air touch input into object operates a connected device, mid-air touch input into object operates a device over the internet, object is painted different colors, user and users mid-air touch feel each other over the internet, object is elongated or indented, two visual objects are joined together, object is enlarged or reduced in size and objects on the internet are touched by the avatar and the touched object's shape is felt in mid-air A Mid Air Hologram Having Mid-Air Touch Description and Operation A user uses their fingers to touch, move holographic, 3D projections created by glasses. The 3D projections have mid-air touch. The touch shape, and visual 3D shape occupy the same space, and move in synch with each other. The view of each other user, is a hologram, is placed near an array, which creates haptic touch when the user touches the hologram.

The user can interact with the touch holograms with their fingers, such as, gasping the objects with their fingers, moving them, feeling their movements, and feeling their mass, etc. The user can interact with other user's avatars over the internet, which are projected near the user's array. Different shaped objects can be created by changing the shape of a mid-air touch shape, and image object by changing the shape of an object in mid-air with the user's hand.

Holographic projection projects into space, free air, the projection zone are about 0.2 to 0.5 meters in front of the glasses. The holographic images position, and distance from the array can be adjusted by the user.

The holographic projector is connected to the computer. The computer is programmed with holographic projections software. The computer sends the projector video stream at 20 to 30 frames a second, or more, to the projector. The projector projects the video stream. The computer connects to gesture recognitions sensors. The sensor sends the computer information about the user's hand gestures interaction with the projected hologram.

The computer connects to arrays of ultrasonic transducers create midair haptic touch. The arrays create different multipoint midair air pressure. The multipoint mid-air pressure creates touch that is associated to the viewed surfaces of the hologram. The associated mid-air haptic touch allows the midair hologram to have a feel which is similar to the holographic image. For example, if the hologram looks like a house, the house's surfaces feel like the house's surfaces. The user can touch the hologram and feel its displayed surfaces. The user's hand 706 receives midair touch when it's above the transducers array. The user can feel the bird moving, and view its movements.

The projector projects the moving hologram above the arrays. The computer synchronizes the display with midair touch to give the holographic surfaces multipoint air pressure. As the hologram changes shape, the multipoint air pressure changes shape to stay associated to the hologram's surfaces. For example, as the house hologram moves, the touch surfaces of the move with the visual surfaces of the house.

The sensors detect the user's hand movement in relationship to the hologram. The user's hand interaction with the hologram, can influence the shape and position of the hologram. The user can shake another user's hand, by using the internet to connect to the other users display. The user can interact with computer generated artificial intelligence holograms with mid-air touch. The user can interact with other users on an internet, by the other users generating holograms on the display with mid-air touch.

The first computer sends, another second user's computer, information about the user's hand. There can be more than two different users projected hands, with the viewing area, for example, four users can view and touch four simultaneously displayed holograms. The second user views the first hand, as a holographic projection, with mid-air touch. The second user can feel, the first user's hand. The first user can feel the second users hand touching their hand, the two users can view, and feel each other shaking hands simultaneously.

The user can use an avatar, above the array, to interact with another user's avatar or a computer avatar. A tennis court can be shown near the array. The user can hold an avatar tennis racket, and move the racket, to hit a tennis ball on their side of the court. The user can feel the ball bounce of the racket. The ball can be sent in to the other side of the court, from the player's tennis racket.

The second user could have a similar mid-air holographic and touch assemble. A second computer is connected to a second holographic projector. The second computer connects to a second internet router, the second router is connected to the internet. The second computer is connected to a second transducer array.

A holographic projected display menu can show a menu of display functions. The projected menu, and web pages allow the user to navigate the internet. The mid-air pages act as mid-air touch screen pages. The user mid-air touches the web pages, using their finger as a cursor, to activate links and visual objects on the pages.

The transducer arrays could be positioned surrounding the four sides of a moving hologram. The arrays could also be on, five sides, three sides or two sides of the moving hologram. The arrays can be angled at different angles other than 90 Such as 65 degree facing outward, toward the user etc. The array directs haptic mid-air touch over the moving hologram.

Two Users and their Avatars Interacting

User can view each other avatar. The avatars can interact with each other on their own artificial intelligence AI, near the array. The users can touch, and feel their, and the other users' avatars. The avatars can be displayed on one array with the users, in close proximity to the array, or the users can be located apart, at different location, and communicating over the internet, or local area network, with each user having their own different array. The users have their own individual glasses.

A Holographic Object with Mid Air Haptic Touch Description

A tube shaped array is used to produce a mid-air touch feedback shape similar to the displayed hologram's shape. The touch hologram can move or be stationary. The hologram and the mid-air touch move in sync with each other, and occupy the same space as they move, or are stationary.

The user can move the hologram. The user can feel the shape of the hologram. The array is large enough, to enable a user's hand to touch the touch feedback hologram. Input buttons can be part of the object. The input button can be touch activated. The activated button can activate a computer function, and or device function.

The display connects to a computer. The array connects to the computer. The computer connects to the internet. A user uses their fingers to touch, move holographic, 3D projections created by glasses. The 3D projections have mid-air touch. The touch shape, and visual 3D shape occupy the same space, and move in synch with each other. The view of each other user, is a hologram, is placed near an array, which creates haptic touch when the user touches the hologram.

A Holographic Object with Mid Air Haptic Touch Description and Operation

The display creates the illusion of 3D objects floating in mid-air. The 3D objects floating in mid-air are individual mid-air floor numbers from 0 to 9, and command keys, such as, door open, and door close A user uses their fingers to touch, move holographic, 3D projections created by glasses. The 3D projections have mid-air touch. The touch shape, and visual 3D shape occupy the same space, and move in synch with each other. The view of each other user, is a hologram, is placed near an array, which creates haptic touch when the user touches the hologram.

The display system, displays a mid-air holographic control panel input display. The display panel shows individual number icons, in mid-air. Each differing icon, is associated with a different computer function. Each differing computer function could be can effect a different operation of a device. The number can be touched in mid-air, by a user's finger located in mid-air. The finger's contact with one of the icons, activates the icon, and activates the computer function associated with the icon. The display senses a user's finger contacting one of a plurality of midair display icons, in mid-air. The display interprets the finger's contact with the icon, as a touch input activation of the icon. The activation of the icon, activates the computer function associated with the icon. The activated computer function, can be associated to the operation of an elevator, an automated teller machine, and a store checkout payment station, etc. The display can be an input display for device. The display can also be a Qwerty keyboard, a plano keyboard, a guitar, and or different touch input icons.

A half sphere shaped array near the 3D displayed objects, is used to produce a mid-air touch feedback shape similar to the displayed hologram's shape. The touch hologram can move or be stationary. The hologram and the mid-air touch move in sync with each other, and occupy the same space as they move, or are stationary.

The user may receive visual feedback from the icons, concerning their finger's location from the device, while midair touch inputting the three-dimensional control panel icons, and use the finger location information, to avoid finger contact with the device. The display gives the user visual feedback, and touch feedback to the finger that has contacted the number. The feedback can be used to allow the user to avoid touching the display. Avoiding touching the display may allow the user to avoid touching bacteria on the display, or creating a static electric discharge between the finger and the display.

The hologram is created using transducers and mr glasses, that project the image onto a surface above the display. This projection would then appear via the optical system, which could be situated between two parabolic or concave mirrors that have reflective surfaces facing each other.

Detailed Description Different Array Embodiments

Viewing Objects which are Sent Over the Internet Description

An array device, is used to create a mid-air, floating holographic object which has haptic touch The holographic object is created from a view of an object or objects. The holographic object's shape is the same as the view of the physical object. The information from the view of the physical object is used to create the hologram similar in shape to the physical object. The view of each other user, is a hologram, is placed near individual arrays that each user has, which creates haptic touch when the user touches the hologram.

The 3D camera is connected to a computer at an outside location. A camera is used for three-dimensional 3D imagining, of the camera's surroundings.

A user uses their fingers to touch, move holographic, 3D projections created by glasses. The 3D projections have mid-air touch. The touch shape, and visual 3D shape occupy the same space, and move in synch with each other. The view of each other user, is a hologram, is placed near an array, which creates haptic touch when the user touches the hologram.

The camera is stereoscopic 3D and streams in real time. The camera is a multiple high-resolution camera inside a unified housing. The camera is connected to a computer. The computer is connected to the internet. The transducers computer is connected to the internet. The transducers' computer is connected to the transducers array. A display is connected to the array computer.

The holograms can be projected outward from the glasses at different distances, from 3 meters to 10 centimeters cm. The size of the hologram can be from 2 millimeters to 3 meters cubed.

Other three-dimensional cameras could be used. Other three-dimensional sensors could be used, and an infrared hand gesture recognition sensor.

The computer is a touch screen computer. The computer connects to the internet using an internet router. Each computer connects to their own internet router. The routers connect to the internet. The second computer connects to the array device's computer over the internet. The mid-air feel is part of the hologram, and occupies the same space as the hologram.

The display panel can also show individual number icons, or a menu of input items, or web pages, which can be touched in mid-air. Each differing icon, is associated with a different computer function. Each differing computer function could be can effect a different operation of a device. The finger's and associated avatar's contact with one of the icons, activates the icon, and activates the computer function associated with the icon. The display senses a user's finger contacting one of a plurality of midair display icons, in mid-air and on the display. The display interprets the finger's contact with the icon, as a touch input activation of the icon. The activation of the icon, activates the computer function associated with the icon. The display can also be a Qwerty keyboard, and or different touch input icons, etc.

Three-dimensional 3D camera software is programmed into the second computer. 3D hologram creating software is programmed into the transducer's device computer.

When the word connected is used, in the reference to the display's assemblage of electrical components, it's implied that the electrical components, are connected by electrical wire, and or information conducting, communicating wire. Other components may use other connections, such as, components which are attached by a physical connection, or connected by radio waves, etc.

The hologram creates the view sent by the camera. For example, if the view is of a car takes up a small area of the camera's view the hologram will be proportional to the camera's view. The more area the car is in the view of the camera to lager the car hologram will be. When the view of the car fills the screen, what is shown on the screen, is created as a hologram, for example, if the view is of a part of the car's door, the view of the door is made into a hologram, the size of the hologram door would be limited to the size of the displayed hologram. The view of an object can be zoomed in and out, which changes the shape of an associated hologram to correspond to the changed view.

Viewing Objects which are Sent Over the Internet Operation

The I glasses receives the view of the object. The glasses create the hologram of the object. The user can view and feel the haptic shape of the object.

The user can view more than one object that they want to make a hologram. The user moves a cursor on the display, to the object they want, and clicks on the object, the clicked object is chosen, to be created into a hologram.

The user can choose to make more than one object multiple holograms. The user clicks on the objects they want as holograms. The clicked objects are created into holograms.

The user can view locations on map 3D world and create and touch holographic objects, similar to the objects at the location. Holographic objects can be created such as, rocks, trees, cars, buildings, people, water, dogs. Users can go to inside locations, on map 3D, such as, history museums, sculpture museums, restaurants, business, and view and create and touch holographic objects, similar to the objects at the location For example the user can search for and locate a 3d camera's view of the Eiffel tower, and a bird, on their computer and display. The user can move a displayed cursor to the item they want to create as a hologram. The user clicks or selects the displayed object, such as, the Eiffel tower, or a bird in the view, or both. The array device creates the holograms of the clicked images. The user can view and feel the shape of the hologram. The hologram moves when the bird move. The user can feel the movement of the bird.

The mid-air touch can be felt three hundred and sixty degrees around the user's hand. Objects in computer games can be felt. Objects in the virtual environment may be, other avatars, waterfalls, trees, cheese cake, space ships, hair, earth quakes, wind, spoons, lightning, sand, heat, cold, and chocolate.

The computer identifies objects by code in the object that tells the computer what the object is. For objects that don't have computer code, the computer can use object recognition to identify the object, for example, the avatar touches a table, the object recognition software identifies the object as a table, and creates a table shape.

The haptic touch array creates mid-air touch that give mid-air feel shape similar to the visual 3D, mid-air hologram object's shape. The mid-air touch can also create the mass, or weight feel of an object. The temperature of an object can be simulated. The movement of an object can be felt by the user.

Objects may be another user's hand, which can be shaken in mid-air, mid-air holograms creatures, 3D mid-air avatars from online player worlds. Objects can be locations, viewed with a camera, such as, 3D pyramids, Stonehenge, the Great Wall, Moon, and Mars. Objects can be locations, such as, mid-air holograms of museum's collections, mid-air holograms of the Smithsonian or Louvre museums art, mid-air holograms from Earth, providing 3D mid-air views of travel destinations, and locations around the world, 3D mid-air views of medical patients bodies, 3D views of and mid-air touch inside an engine, and moving holograms of people's faces and bodies, etc.

A user can view a scene from a web cam (not shown) connected to the internet. The user's avatar can move around within the web view, and touch objects within the scene. The touched objects can be felt in mid-air touch. A web cam can have a view, such as, a view of a street with-stores. The avatar, or user's fingers, can touch a parked car, on the web cam street view, and the user can feel the different surface feelings, of the car. The user could feel water, from a water fountain, splashing on a user's hand, in the scene. The user can touch another user's displayed face, with the avatar hand. The user can feel the users face.

The user can touch, displayed stationary and moving images, such as, as touching a metal support of an Eiffel tower, or feeling a polar bear breathing while touching their fur. The user can feel the use of a tool such as a wrench to loosen bolt. Users can touch visual 2D or 3D scenes, on the internet, such as, images in goggle street view, or map earth. Users can move around in online internet virtual 2D or 3D environments, and touch 2D or 3D objects, and touch other 2D or 3D avatars in the environment. Users can touch inside a real or virtual 2D or 3D product, such as, an espresso coffee machine. The machine can be made large, or the avatar can be made small, and touch and move around inside the machine. Viewing and touching inside the machine, could be used for machine production quality control, or increased design information about the machine, etc.

Creating Holographic Objects from Viewed Objects No Internet

Mid-air haptic touch can be used in medical situations, such as, feeling and viewing the of the inside of a heart. Haptic touch can be used in manufacturing and maintenance, such as, to touch and view a coffee machines water compressor.

A user uses their fingers to touch, move holographic, 3D projections created by glasses. The 3D projections have mid-air touch. The touch shape, and visual 3D shape occupy the same space, and move in synch with each other. The view of each other user, is a hologram, is placed near an array, which creates haptic touch when the user touches the hologram.

The users hand gesture signals what the user wants to do with their hands. For example, the user puts their thumb and finger together in a pinching motion, and grasps pinches and the user can pull or indent the area of the hologram that is pinched. The user puts their fingers to form a flat hand, the gesture is recognized as a knife the user can cut off parts or the hologram.

A hologram tool set can also be used to shape a hologram. The user can grasp a holographic knife, and use the knife to cut parts of the hologram. A grasping tool held by the user, can grasps and pinch the hologram, the user can pull or indent the area of the hologram that is pinched with the tool.

The object viewing camera an also be connected to the user's computer at the inside location, for viewing objects at the user's location.

Input devices can be created to operate different devices. One mid-air input device can be used for operating a variety for different device. For example, on a space station the mid-air input device can operate, the space station moving arm, and then in a different input configuration, the input device can operate the station camera mover. The mid-air input can operate many devices, without the need of having two or more different input devices. The visual device can be created in virtual reality, and the physical touch input device can be created using mid-air touch array. Almost any input device to operate one or more devices can be created.

Mid-air touch is associated to what is near the array, for example, if a strawberry is receiving mid-air touch, the user can touch the whole strawberry, if the strawberry is enlarged to where only a portion of the visual strawberry is near the array, the user can touch the part of the strawberry near the array. The feeling of the strawberry would change to that of what the enlarged strawberry would feel like.

For example, a health care provider, can view and feel the inside of a patient's artery. The provider, using the avatar, can indent displayed plaque inside the artery. The provider can remove plaque, and an artery stent can be placed inside the artery. The provider can feel and view how the change to the artery effect the feel and view of the artery.

A user's hand, or other body part can be used to interact with 3D visual mid-air touch objects. The hand is able to touch and feel objects, move objects, zoom in and out objects, enlarging or making the object smaller.

The user can input commands on a keyboard, or mid-air hand gestures, to change the shape an object. The user activates an object shape changing mode, the object can stay stationary, and the user can use the hologram avatar to contact and pull or push the object, to indent, compress, or pull, or elongate an area of the object.

The user can touch and feel objects, move objects, zoom in and out on objects, enlarging or making the object smaller, changing the shape of objects, cutting objects, and combining objects.

In object material removing mode, material can be added or removed by the avatar grasping a part of the object to be removed, and moving it away from the object, detaching it from the object. To change the objects shape, detached material can be added by replacing it the removed area, or in a different area. Objects can be combined to change their shapes. The objects are put in combining mode. Two or more objects can be place together, touching each other. The objects are fussed, joined together, where they touched, when the combing mode is exited. An object cutting tool can be used to cut, and separate an area of the visual image of the object.

Holographic sculptures and objects can be created by changing the shape of a pliable object by changing the shape of an object in mid-air with the user's hand. Environments can be created where user created objects are displayed and touchable by other users.

Three dimensional cameras can be used to view, and to create 3D models of locations, such as, rooms, people, a bird, and objects. A camera maps 3D spaces of rooms, which avatars can move in, view, and interact in the room.

Another way to create haptic touch from 2D or 3D, mid-air holograms viewed object is for the computer to use try to identify the surface textures of and object, and create those textures in midair above the array.

There are different ways the computer can generate the feel of an object. Images can have computer code in the picture that is activated when the avatar touches the object, the activated object signals the transducer array to generate haptic touch that allows users to feel the object with mid-air haptic touch. Another way is the computer interprets the different lighting and shading of a picture as differing mid-air touch. The differing mid-air touch is similar to the features of the object. Another way is the computer interprets differing 3D image's information into differing haptic touch. Another way is the computer interprets a pictures light textures as haptic touch. Another way is assigning and associating differing mid-air feeling to differing objects. The differing objects have the preprogrammed feeling can be embedded in touchable objects, for example, an avatar touching water will create a mid-air touch water feeling on the user's hand near the array.

A variety of ways can be used to create the surface and movement feel, of two 2D or three-dimensional 3D objects. The viewed 2D or 3D objects may have preprogrammed touch information that can be sent to the user's computer from the computer creating the view of the displayed object. The user's computer can generate midair touch from the received preprogrammed object data. For example, preprogrammed information may include, what the object should feel like, such as, the computer identifying a displayed car in the 2D or 3D, mid-air holograms view. The web site or user, can preprograms how a car feels, and the car's various objects feel. When the user's avatar touches a part of the car, the computer has the array generate the mid-air feel of the object that the avatar is touching.

Mid-air touch can be used by health care providers, such as, aiding medical patients. The health care providers can touch the 3D visualizations of the inside of a patient's body, such as, the patient's heart, brain, spleen, etc.

A 3D printer can be connected the computer. The user can instruct the computer to instruct the 3D printer to print the 3D shape of the object. The printer to prints the 3D of the object from received computer instructions. A 2D printer can be connected the computer. The user can print the 2D visual view of the object.

The display means is the display, the mid-air touch shape creating means is the mid-air haptic touch transducer array, the finger gesture recognition means is the mid-air finger gesture recognition camera, and the 3D printer means is the 3D printer.

Users Touching and Inputting into Objects at Distant Locations Description

A wall of transducers, combine their holograms to create a big hologram. A first group of Kinect cameras, are positioned to view a first user. The cameras, and display, are connected to a first computer. The first computer is connected to the internet. A microphone and speaker are connected to the computer.

The first computer connects to a second computer, over the internet. The second computer connects to a group of transducers device which are position vertically, to create a user sized hologram.

A second group of cameras, are positioned to view the user's hologram, a second microphone, and a second speaker, connect to the second computer. A touch screen computer, a keyboard, a paper box, and another second user are within touching distance of the user's hologram.

Users Touching and Inputting into Objects at Distant Locations Operation

The first user views the second location, and their holograms movements on the computer display. The movements of the user and their hologram are synchronized. If the user moves, the hologram moves the same way as the user. The user uses the view of their hologram to move their hologram.

A user uses their fingers to touch, move holographic, 3D projections created by glasses. The 3D projections have mid-air touch. The touch shape, and visual 3D shape occupy the same space, and move in synch with each other. The view of each other user, is a hologram, is placed near an array, which creates haptic touch when the user touches the hologram.

The hologram is operated by the first user, and can touch other users, who are within touching distance of the hologram. The other user can feel the touch of the hologram on their body. The hologram and the hologram's operator, can talk to, and listen to other users. The hologram can give a back rub.

The user can operate the hologram to pick up and hold things like a piece of paper. The hologram can be positioned at different locations, such as, a coffee shop. The hologram can type on touch screen display, on a mid-air touch display, on a regular keyboard, people can have their holograms go to work for them, and operate their holograms from their apartment. The use can direct their hologram to go a casino betting table, black jack, can type on touch screen display.

The display, and hologram allow users, to have simultaneous visual displayed interaction with each other. The first user views the other user on the display, and the other user views the first user's hologram.

The users can transmit vocal communication with each other using the microphones. The users can receive audio communication from each other using the speakers. The user can receive sound associated with computer generated objects, and avatars from the speaker.

The user can go to individual different array devices, using the internet, at located different locations, and interact with the users at the locations.

An example of the user's hologram interacting with people at a location could be, the user can virtually travel to a casino and place bets on a dice betting table. The table can be set to accommodate holographic reality players. The table can be a screen that shows where a virtual reality payer places their bets, or someone could place the bets for them. The virtual reality traveler's face, and or body and face can be holographic ally projected, which users at the table can view. A dice throwing machine could be at the table and connected to the internet, to allow the holographic user to control the machine. The holographic user could throw dice using the machine. The dice machine can, and be controlled by the hand movements of the virtual reality user, and touch of the hologram. The holographic user's presence and actions at the table are the same as people at the table, except the holographic user's body isn't physically present.

The hologram can be automated. The second computer can be programmed with visual user recognition software. The holograms can do customer service computerized hotel check in; mobile holograms can shake people's hands. The holograms can converse with users, by using personal virtual assistants. which gives replies to verbal questions. Verbal conversational software is programmed in to the computer, to allow the holograms to converse with users.

Users can shake each other holographic hands. The user's view and feel the other user's hand in mid-air. The hand is connected to the user's holographic displayed body.

Users Touching Each Other by Touching Each Other's Holograms Description

Users can simultaneously touch each other by touching each other's holograms. Users can communicate with holograms when they are in different location, by sending data of themselves over the internet, having the data received by a computer. The holograms have mid-air haptic touch.

A user uses their fingers to touch, move holographic, 3D projections created by glasses. The 3D projections have mid-air touch. The touch shape, and visual 3D shape occupy the same space, and move in synch with each other. The view of each other user, is a hologram, is placed near an array, which creates haptic touch when the user touches the hologram.

A first group of transducers and computer, is located at a first location. A hundred and forty-four small transducers, nine 9 medium transducers, one big small transducer, is positioned to project a standing user. More transducers can be used to increase the definition of the holograms. Transducers are positioned, to each project ultrasonic vibration beams to create the hologram.

The transducers are connected to a first user's computer. The transducers can be arranged in different configurations to each other, such as, a wall of transducers can be created, by 12 transducers with 3 transducers in one horizontal row, and 4 of the rows vertically on top of each other. One big transducer is connected to the first computer. A first group of cameras, and display, are connected to the first computer.

The first computer is connected, to an internet router by WIFI, the router connects to the internet. A first group of cameras, are positioned to view the first user.

A second group of transducers having the same configuration as the first group of transducers, cameras, and computer in a similar configuration as the first group, are located at a second location. The second group is configured to view a second user transducers. The first transducers and second computer transducers are connected to each other over the internet.

The cameras are placed on camera holders (not shown). The computers are placed on computer holders (not shown). Each computer has a microphone, and speaker.

Users Touching Each Other by Touching Each Other's Holograms Operation

User can touch just a part of and other user's body. People can simultaneously touch each other's holograms. A first band second user, have their body viewed by the 3D cameras. The camera views of the user are stitched together, by the computer and software, to create the 3D view of the user. The view of each other user, is a hologram, is placed near individual arrays that each user has, which creates haptic touch when the user touches the hologram.

Users have a view of each user's body which is being sent to the other user's glasses. The sent view of the user's body, is used to create the hologram of their body, by the receiving glasses. Each user is within touching distance of one of the glasses holograms. The first user can touch the second user's hologram of their body, the second user can touch the first user's hologram of their body. Each hologram moves in real time. The users can feel the other user's holographic touch. More than two users can create holograms, and touch each other's holograms.

Users can engage in simultaneously holographic sexual activity with each other. The user's genitals can be stimulated by the touch of the other user's hologram. The holograms and transducers can be located near the user's genital's, to mid-air touch stimulate the genitals, by producing feelings similar to sexual stimulation, or other unique feelings made possible by the mid-air touch shapes.

User can touch a multiple of other users in real time by creating two or more user holograms. Two user holograms are created by two array devices, each array device creating one of the unique users. One array device could also create two different holographic users.

Users can talk to and hear each other using the computers microphone, and speakers. Users can grab, throw and catch an object back and forth between each other, such as, a ball, a Frisbee.

Medical providers can operate robotic surgery machines, over the internet, performing surgery on a patient. The surgery provider can mid-air touch feel the operation of the robotic hand input devices, and feel the input devise inter action with the patient's body. The provider can also hold and operate mid-air touch tools, and feel the tools, and with the patient's body. User can play online computer games, such as, online internet role playing games. Users can view, touch and feel touch objects, and avatars in the game.

Users and people at the location can interact with each other. People at the location can view virtual reality users, or the user's avatar on a display, or holographic projection. Users can view the people, using cameras at the location, etc. People and the user can touch each other, using connected arrays. Users talk to each other using microphones, and speakers. Users avatars at cafes, can order virtual coffee and food, which can be sold by the café. Virtual tables can be set up for virtual users to sit at. Mid-air touch holograms can provide a surgeon with information, which are otherwise hidden, such as showing the heartbeat rate, the blood pressure, the state of the patient's organ, and feel of the patient.

Real time 2D, or 3D cameras and displays can be used at locations in the world, and view real world objects and people. The cameras allow to people at the location, and virtual reality users on the internet to congregate and communicate with each other. Locations where people, and virtual reality users on the internet, can go to, and meet each other, talk to each other, and can touch each other. Virtual reality users can meet other people on the internet, and go to a café and have a coffee anywhere in the world, and communicate with people at the location they go to. The user can have an avatar located at a location that is viewable, by other users. The user can view the other user's avatars.

The users and their avatars can communicate with each other, using touch, visually, and audibly. The users can communicate with people at locations, with glasses, microphone, and speakers, at the locations. Locations where people, congregate may include, cafes, bars, taverns, restaurants, outdoor café, beaches, music concert halls, sports events, libraries, lectures, and class rooms, etc. Cameras can be placed that allow people on the internet using virtual reality headsets, and glasses, to communicate with people, at locations.

Multiple Transducers and a Big Transducer Used to Create Larger Holographic Objects Description A wall of transducers, and a big transducer both create the same holograms. The different transducers configurations are two different ways of creating the same holograms.

A user uses their fingers to touch, move holographic, 3D projections created by glasses. The 3D projections have mid-air touch. The touch shape, and visual 3D shape occupy the same space, and move in synch with each other. The view of each other user, is a hologram, is placed near an array, which creates haptic touch when the user touches the hologram.

Five or more hologram transducers are position vertically. The transducers can be arranged in different configurations to each other, such as, a wall of transducers can be created, by 12 transducers with 3 transducers in one horizontal row, and 4 of the rows vertically on top of each other. One big transducer is connected to the hologram computer. The view of each other user, is a hologram, is placed near individual arrays that each user has, which creates haptic touch when the user touches the hologram.

A camera is connected to the inside computer. A mouse, and a touch input screen is connected to the computer.

Each computer connects to their own internet router. The routers connect to the internet. The second computer connects to the glass's computer over the internet. A glasses computer connects to the transducer's computer.

Multiple Arrays and a Big Arrays Used to Create Larger Holographic Objects Operation The user can choose to make more than one hologram object, or multiple hologram objects. The user clicks on the objects they want as holograms. The clicked objects are highlighted. The clicked objects are created into holograms.

The user can use the hologram like a touch display. The view can be moved up, down, left right, zoomed in, and zoomed out, by the user's hand gestures in mid-air. The hand gestures are with in view of the camera. The view of each other user, is a hologram, is placed near individual arrays that each user has, which creates haptic touch when the user touches the hologram.

The display can also change the viewed hologram. The hologram can be the same view as being shown on the display. If 2D and or 3D views are being shown on the display, the hologram will replicate the 2D and 3D display views.

The user can move the view using, a mouse input, a touch screen input, or mid-air hand gesture input. The one big transducer can be used to create a human sized hologram. The computer creates the 3d shape as the hologram view moves the holograms changes.

The user can have a performer's performance viewed and sent over the internet to the user's computer. The glasses device can create the hologram of the user's movements in real time. The audio of the performer can be heard being broadcast by the speaker. With 2d views the computer can use object recognition to identify objects, the identified objects can be outlined, showing the available objects to be clicked on.

The glasses display holograms, with different colors, like, green, purple, white, black, and orange. The surface feel of the hologram, can be similar to the objects surface. The hologram produces the objects feel, such as, a smooth feel, a rough feel, etc. The object consistency of the object can be felt, such as, a hard feel, a soft feel.

The objects temperature can be felt, such as, a warm feel, a cool feel, and room temperature fell, etc. The objects movement can be felt, such as, a spinning fell, a vibrating fell, an up, down, sideways, extending, or retracting movement feel, a flowing feel.

Additional Rewording of Embodiments

An array of ultrasound generators creates a variety of shapes such as cubes and spheres which the user can feel when they place their hand above the array. The array can be used in concert with a display, such as a holographic display. Touchable holograms, immersive virtual reality that you can feel and complex touchable controls in free space, are possible ways of using this system. The view of each other user, is a hologram, is placed near individual arrays that each user has, which creates haptic touch when the user touches the hologram.

Even imperfect haptic holograms could be enough to create a very realistic tactile experience. Even if there are discrepancies, the brain will bend what it sees and feels to fit the overall picture.

Uses for mid-air haptics; for example, in gaming, a user could feel a physical ball while playing with a sensor or instance. User interfaces for a variety of technologies would be another particularly if it was combined with holographic visuals. Uses for medical technology, such as, being able to feel around inside a 3D model of a CT scan to touch a tumor.

Users can feel holograms of objects that would not otherwise be touchable, such as understanding the shapes of artefacts in a museum. Users interact with each other on the internet, using sound and visual information. Midair haptic touch allows users to interact with touch over the internet. Midair haptic touch may give an additional expansion of the possibilities, which users can use to communicate with each other. The view of each other user, is a hologram, is placed near individual arrays that each user has, which creates haptic touch when the user touches the hologram.

Midair touch may be used by a user, in 3d, Holographic visual worlds and computer games. Mid-air touch may bring a more immersive, full bodied and enjoyable interactive user experience.

Users can control mid-air holographic avatars, using midair hand gestures, which are sensed by a gesture recognition sensor. Midair touch is created by a transducer array which the user can feel, by placing their hand in midair, near the transducer array. A mid-air hand gesture recognition sensor detects the user's finger's touch of the mid-air touch shape. A transducer array directs ultrasonic energy to where the finger touches the mid-air shape. The ultrasonic energy, on the user's finger, creates the feel of the shape of the object, where the finger touches the object.

In one embodiment an avatar may be a depiction of a person shown on a two dimensional or three-dimensional 3D display, or a virtual reality 3d headset, or glasses. The user views their avatar on the display, and has their hand near a transducer array. The transducer array creates mid-air haptic touch. The mid-air touch array creates the object and surface of the object touched by the avatar. The user can feel what the avatar's hand is touching, which is shown on the display. Input devices, such as, a joy stick, a mind input controlling headset, eye gaze recognition input devices, can be used to move a displayed avatar.

In a second embodiment, holograms can be projected near an array, the computer creates haptic touch similar to the shape of the hologram. As the visual shape of the avatar changes the haptic shape changes to match the shape of the avatar. The user can move the holograms around and feel he holograms consistency. A user can interact with other users' hologram avatars, computer avatars. Users can shake each other's hands avatar, visually and haptic tactilely.

The user can pick objects up, feel there, weight, their pliability, the objects viscosity, the user's hand can squeeze them an feel their compression, and expansion when releasing the hand pressure, can feel water, simulated hot or cold temperatures, feel the movements from objects, such as, feeling the movement of dog with, feeling the impact of an object, such as, a ball being caught.

The environment and objects maybe at a location, in a 3d gaming world, or a location in 3d maps, or maps of mars. Mid-air touch interaction can be used with other users in 3d environments, by connecting over the internet, users can haptic ally feel contact with each other. Depending on the size of the transducer arrays, haptic touch can be generated for a user's hand, or in lager array for a user's body.

The user feels what the avatar is touching. For example, if the view of a building is zoomed in, and the view of the surface of the building is enlarged the user will feel the new smaller area texture of the building. If the view is zoomed out the user feel the building as if it was a small building.

There are different ways the computer can generate the feel of an object. Images can have computer code in the picture that is activated when the avatar touches the object, the activated object signals the transducer array to generate haptic touch that allows users to feel the object with mid-air haptic touch. The differing objects have the preprogrammed feeling can be embedded in touchable objects, for example, an avatar touching water will create a mid-air touch water feeling on the user's hand near the array. Another way is the computer interprets the different lighting and shading, light textures, of an image as differing mid-air touch haptic touch. The differing mid-air touch is similar to the features of the object. Another way is the computer interprets differing 3d images information into differing haptic touch. Another way is the computer interprets, recognizes objects in images. The recognized objects are associated to mid-air feelings similar to the recognized objects, and the mid-air feeling is created near the array.

Mid-air haptic touch can be used in medical situations, such as, feeling the view of the inside of a heart. Haptic touch can used in manufacturing and maintenance, such as, to touch a coffee machines water compressor.

Two or more glasses displays with haptic midair touch and gesture recognition, can be connected together, through a local area network, or over the internet. The projected holograms can be connected together, on each user display, using the internet. The connected displays, allow users to have simultaneous touch interaction, with each other. The connected projected holograms also allow users, to have simultaneous visual displayed interaction, with each other.

Users can use avatars, to interact with each other, on the display. The users can feel the interaction between the avatars. Users can interact with mid-air touch within computers games, with other users, or with computer artificial intelligence created projected holograms avatars.

Users can touch objects, in virtual worlds on the internet. Users can touch and feel real world objects, on the internet.

Advances in technology have made mid-air touch associated to a glasses image possible. Advances in computer software, an increase in the speed and storage abilities of computer processors, virtual reality headsets, 3D mid-air displays, transducer arrays, the internet, and mid-air touch cameras, etc.

CONCLUSIONS, RAMIFICATIONS AND SCOPE

From the preceding description, and drawings, it becomes apparent that mixed reality glasses, displaying 3d images in midair, can have a touch feel. The feel being haptic touch, produced by transducers, occupying the same space as the images. The feel being similar to the feel of the image. Communicating with avatars that have touch with other users on the internet, creating different shaped objects, displaying the created objects.

The displayed avatar, that the associated similar mid-air touch shape device, allow touch to be incorporated into the visual world on the internet. The device allows mid-air touch to be used in a variety of ways with visual objects, such as, used to let a user feel when they've touched a visual mid-air input button, communicating with touch with other users on the internet, creating different shaped objects, and creating touch able input device.

The mid-air touch shape associated with the visual shape device, could be made out of self-assembling nano particles, or a plastic membrane, or a force field, or a molded gelatin, or air flow out of air nozzles, or self-assembling metal pieces, that can assemble into the shape of the visual shape.

Addition of the touch sense, to the imagines visual sense, and audible sound sense increase the immersive experience of the user.

Thus, the reader will see that at least one embodiment, of the user MR glasses images having a feel, from transducers, provides a more reliable, fun, immersive, healthier and economical device that can be used by persons of almost any age.

It will be readily understood that the aspects of the present disclosure, as generally described herein, and illustrated in the figures, can be arranged, substituted, combined, separated, and designed in a wide variety of different configurations, all of which are explicitly contemplated herein.

It will be apparent that various changes and modifications can be made, without departing from the scope of the various embodiments.

The invention claimed is:

1. An augmented reality system configured to display a hologram in midair, the augmented reality system comprising:
    a head mounted display (HMD) for displaying the hologram;
    a transducer array for generating a touch feel near the hologram,
    wherein the transducer array includes an array computer, and the touch feel is felt by a finger of a user where the finger contacts the hologram; and
    a headset computer for identifying shading of the hologram, and changing the touch feel of the hologram based on the shading, and wherein the headset computer is wirelessly connected to the array computer.

2. The augmented reality system of claim 1, further comprising a camera for imaging the finger of the user to perform the detection of the finger in contact with the hologram, wherein the touch feel is located on the hologram at the location that the finger is detected contacting the hologram.

3. The augmented reality system of claim 1, wherein the touch feel fills in a shape of the hologram.

4. The augmented reality system of claim 1, wherein the hologram is pinned to the location near the transducer array, the hologram stays at the location near the transducer array if the HMD changes location, further including a plurality of transducer arrays, the plurality of transducer arrays are positioned to create an enclosed area, transducers on the transducer arrays are located in the enclosed area, haptic touch is directed to inside of the enclosed area by the transducer arrays.

5. The augmented reality system of claim 1, wherein the hologram changes shape, a change in the shape of the hologram is associated with the location of the touch feel moving, the touch feel moving can be felt by the finger in contact with the hologram.

6. The augmented reality system of claim 1, wherein the hologram is an avatar of the user, the avatar is sent from the HMD over an internet to a second head mounted display (HMD) display, the avatar is located in midair near a second transducer array, the second transducer array creates a second touch feel associated with the avatar, and a second camera is connected to the second HMD, there is a second avatar of a second user, the second avatar is sent by to the second HMD over the internet to the HMD, the second avatar is located in midair near the transducer array.

7. The augmented reality system of claim 1, wherein the HMD has a wireless connection to an internet; and
    the hologram is a website, wherein images of stationary or moving objects are viewed on the website.

8. The augmented reality system of claim 1, further comprising:
    the HMD displaying the hologram on a website;
    a plurality of additional head mounted displays for displaying the hologram on the website to additional users;
    a plurality of additional transducer arrays;
    the hologram on the website is located near each of the plurality of additional transducer arrays, the additional transducer arrays supply touch feel to the hologram on the website.

9. The augmented reality system of claim 1, wherein the hologram is a menu of icons representing a plurality of different functions and interaction mechanisms.

10. The augmented reality system of claim 1,
    wherein the hologram includes a moveable avatar and a menu of icons with different functions and interaction mechanisms, the moveable avatar is associated with the movement of the finger of the user, wherein the headset computer executes a function of the different functions based on the avatar contacting an icon of the menu of icons.

11. A method for displaying a hologram in midair with an augmented reality system, the method comprising:
    displaying the hologram on the head mounted display (HMD);
    generating a touch feel near the hologram with a transducer array, wherein the transducer array includes an array computer, and the touch feel is felt by a finger of a user where the finger contacts the hologram; and
    identifying shading of the hologram by a headset computer,
    changing the touch feel of the hologram by the headset computer based on the shading, wherein the headset computer is wirelessly connected to the array computer.

12. The method of claim 11, further comprising:
    detecting where a finger of the user touches the hologram with a camera positioned to view the hologram and the finger of the user;
    producing the touch feel by the transducer array when the finger touches the hologram.

13. The method of claim 11, wherein the touch feel fills in the shape of the hologram.

14. The method of claim 11, further comprising:
    connecting the HMD to a device over the internet;
    Displaying an image of the device, with input icons for activating functions of the device, on the HMD;
    Detecting with a camera the finger contact with one of the input icons,
    Activating based on the finger contact with the one of the input icons one the functions of the device.

15. The method of claim 11, wherein the transducer array has a three-dimensional shape, and the hologram overlays the transducer array.

16. The method of claim 11, further comprising:
    executing object recognition in the HMD, the object recognition identifies an object;
    creating a hologram in a shape similar to the object.

17. The method of claim 11, further comprising:
displaying a moveable avatar and a menu of icons with different functions and interaction mechanisms, the moveable avatar is associated with the movement of the finger of the user;
executing a function of the different functions based on the avatar contacting an icon of the menu of icons.

18. The method of claim 11, further comprising:
displaying a menu of icons;
unpinning the hologram from a current location based on contact of the user finger with the hologram;
pinning the hologram to a desired location based on contact of the user finger with the hologram.

19. The method of claim 11, further comprising:
displaying the hologram as a menu of icons representing a plurality of different functions and interaction mechanisms.

\* \* \* \* \*